United States Patent [19]

Nakata

[11] Patent Number: 5,500,857
[45] Date of Patent: Mar. 19, 1996

[54] INTER-NODAL COMMUNICATION METHOD AND SYSTEM USING MULTIPLEXING

[75] Inventor: Toru Nakata, Yokohama, Japan

[73] Assignee: Canon Kabushiki Kaisha, Tokyo, Japan

[21] Appl. No.: 151,986

[22] Filed: Nov. 15, 1993

[30] Foreign Application Priority Data

Nov. 16, 1992 [JP] Japan .................................. 4-330023
Dec. 16, 1992 [JP] Japan .................................. 4-354646

[51] Int. Cl.$^6$ .......................... H04J 14/02; H04J 14/08; H04J 4/00
[52] U.S. Cl. ............................ 370/50; 359/118; 370/85.7
[58] Field of Search ......................... 370/85.1, 77, 95.1, 370/29, 95.3, 58.1, 50, 94.1, 60, 68, 85.4, 112, 85.7, 85.8, 85.11, 85.12, 85.13, 85.14, 95.2, 95.3, 94.3, 56; 359/118, 119, 164, 173, 183, 188, 199, 126, 152, 114, 115, 120, 121, 123, 124, 135; 385/18, 26, 16, 46; 380/49, 54, 9, 118, 137; 340/825.03

[56] References Cited

U.S. PATENT DOCUMENTS

| | | | |
|---|---|---|---|
| 4,896,934 | 1/1990 | Arthurs et al. | 359/118 |
| 5,317,560 | 5/1994 | Ingre et al. | 370/85.4 |

FOREIGN PATENT DOCUMENTS 0497005  8/1992  European Pat. Off. .

OTHER PUBLICATIONS

Computer Comm., vol. 11, No. 6, 1988, pp. 304–312, Senior et al. "Performance investigation of a token passing access protocol for a multichannel optical fibre LAN".
Proc. IEEE INFOCOM '87, Computer Comm., 1987, pp. 417–425, Sharrock et al., "A Broadband-based Integrated Voice/Data/Video Network of Multiple LANS with Dynamic Bandwidth Allocation".
Proc. INFOCOM '90, Computer Comm., pp. 850–857, Mark et al., "A dual-ring LAN for integrated voice/video/data services".
IEE PRoc. E. Computers & Digital Techniques, vol. 134, No. 1, Jan. 1, 1987, pp. 1–8, Halsall et al., "FAMNET: an integrated voice and data network."Proc. Supercomm/ICC '92, Int. Conf. Comm., Jun. 14, 1992, pp. 848–854, Cheung, "Design and Implemenatation consideration for wavelength--Division multiplexed (WDM) photonic dual bus".
Proc. 18th Ann. Int. Symp. on Computer Architecture, May 27, 1991, pp. 96–105 Dowd et al., "High Performance Interprocessor Communication Through Optical Wavelength Division Multiple Access Channels".
IEEE Comm. Magazine, vol. 26, No. 11, Nov. 1, 1988, pp. 45–60, Cochrane et al., "Future Optical Fiber Transmission Technology and Networks".

*Primary Examiner*—Benedict V. Safourek
*Assistant Examiner*—Dang Ton
*Attorney, Agent, or Firm*—Fitzpatrick, Cella, Harper & Scinto

[57] ABSTRACT

A communication system includes a plurality of nodes, a data signal line and a control signal line. The plurality of nodes are coupled to each other through the data signal line so as to perform communication by using a signal multiplexed by at least one of a wavelength-division multiplexing scheme and a time-division multiplexing scheme. The plurality of nodes also coupled to each other through the control signal line by which a control signal including a management table indicative of at lease one of a time slot and a wavelength of a signal used for communication in the data signal line is circulated. Each node inputs a control signal circulating through the control signal line to select at least one of a time slot and a wavelength of a signal not used for communication on the basis of the management table of the input control signal, so that the communication is performed through the data signal line by using at least selected one of the time slot and the wavelength of the signal and the management table is updated to be outputted to the control signal line.

22 Claims, 23 Drawing Sheets

MANAGEMENT TABLE WC

FIG. 6A  WC  | $\lambda_1$ | $\lambda_2$ | $\lambda_3$ | | $\lambda_n$ |
              |  1  |  0  |  1  | ------ |  0  |

FIG. 6B  WC  | $\lambda_1$ | $\lambda_2$ | $\lambda_3$ | | $\lambda_n$ |
              |  1  |  1  |  1  | ------ |  0  |

FIG. 6C  WC  | $\lambda_1$ | $\lambda_2$ | $\lambda_3$ | | $\lambda_n$ |
              |  1  |  0  |  1  | ------ |  0  |

INTER-NODAL COMMUNICATION METHOD AND SYSTEM USING MULTIPLEXING

BACKGROUND OF THE INVENTION

1. Field of the Invention

The present invention relates to a communication method and a communication system for performing communication by using a signal multiplexed by at least one of wavelength-division multiplexing and time-division multiplexing.

2. Related Background Art

Recently, a system loading a large quantity of information such as motion picture information in a computer network has been studied. For example, a wavelength multiplexing communication system such as a WDM (wavelength-division multiplexing) composite type optical LAN (local area network) described in OQE91-126 has been proposed. In this system, a plurality of wavelengths $\lambda_a$ and $\lambda_1$ to $\lambda_n$ are used. Communication of low-speed data and wavelength control information is performed through an existing LAN by using the wavelength $\lambda_a$, whereas the wavelengths $\lambda_1$ to $\lambda_n$ are used to perform communication services which are independent of speed (i.e., which may include services of various speeds) by wavelength multiplexing transmission. Signals of these wavelengths $\lambda_a$ and $\lambda_1$ to $\lambda_n$ are accommodated in one loop type transmission path.

As a wavelength multiplexing transmission scheme, a demand-assign wavelength-division multiplexing access (DA-WDMA) scheme is employed. In this scheme, when high-speed communication or communication with a long holding time is requested between some nodes, a specific wavelength is assigned to the communication between the nodes, and a channel is formed by the wavelength to perform the communication.

The wavelength assignment method will be described in detail below with reference to FIGS. 1 and 2. FIG. 1 is a block diagram showing the function of each node in the system described above. Each node includes a communication control circuit 16 for an existing LAN, a communication control circuit 17 of the DA-WDMA scheme, an interface circuit 18, a demultiplexer 10, a multiplexer 11, and an optical transmission path 20. The interface circuit 18 connects a signal from a terminal (not shown) to the communication control circuit 16 for the existing LAN or the communication control circuit 17 of the DA-WDMA scheme depending on the type of signal (e.g., a signal with a small quantity of information is connected to the communication control circuit 16 for the existing LAN, and a signal with a large quantity of information is connected to the communication control circuit 17 of the DA-WDMA scheme). FIG. 2 shows the network arrangement of the system. A control node 201 manages wavelengths used for communication by the respective nodes. Nodes 202 to 205 serve to perform communication between terminals.

A method of transmitting high-speed data from the node 203 to the node 205 will be described first. When the node 203 generates a request to transmit high-speed data such as video data, the interface circuit 18 supplies the transmission request and a reception node information signal to the communication control circuit 16 for the existing LAN. The communication control circuit 16 for the existing LAN converts the information into an optical signal having the wavelength $\lambda_a$ and transmits it by an existing communication scheme such as a token passing scheme, a TDMA (time-division multiplexing access) scheme, or a slotted loop scheme. This optical signal is accommodated in one optical transmission path by the multiplexer 11 and is output to the optical transmission path 20. The optical signal then reaches the control node 201 through the nodes 204 and 205. The control node 201 has a wavelength table and manages the use of the respective wavelengths by specific nodes. First, the control node 201 checks the state of the node 205. If the node 205 is receiving a signal, the node 203 is set in a standby state. If the node 205 is not receiving a signal, the control node 201 assigns a transmission wavelength according to the wavelength table and informs the wavelength information to the node 205 to cause it to prepare for reception. The control node 201 then informs the wavelength information to the node 203 to cause it to start transmission. A signal from the control node 201 is transmitted through the existing LAN by using the wavelength $\lambda_a$. The signal is input to the nodes 205 and 203. In each node, the signal is separated from signals having other wavelengths by the demultiplexer 10. The signal is then input to the communication control circuit 16 for the existing LAN. The communication control circuit 16 for the existing LAN informs the assigned wavelength to the communication control circuit 17 of the DA-WDMA scheme. In the node 203, the wavelength of an optical transmitter in the communication control circuit 17 of the DA-WDMA scheme is set to the assigned wavelength to transmit the video signal. In the node 205, the wavelength of the filter of an optical receiver in the communication control circuit 17 of the DA-WDMA scheme is set to the assigned wavelength to receive the video signal from the node 203. When the transmission from the node 203 is completed, the node 203 informs the end of transmission to the control node 201. The control node 201 updates the wavelength table. The node 205 cancels the setting of the filter. With this operation, the communication is completed.

Similarly, wavelengths are assigned among other nodes by the control node 201 to perform communication. In this manner, assignment of wavelengths is managed by the control node 201 alone.

In the conventional system described above, since the control node manages all the wavelengths, the control node is required to have high reliability, resulting in an increase in the cost of the control node. In addition, since communication is performed by instructions from the control node, the communication procedure is complicated.

SUMMARY OF THE INVENTION

It is an object of the present invention to provide a communication method and a communication system, which can solve the problems of the related art described above and allows distributed management of wavelengths or time slots at each node without installing a control node.

In order to achieve the above object, according to the present invention, there is provided a communication system comprising:

a plurality of nodes;

a data signal line, coupling the plurality of nodes to each other, for performing communication by using a signal multiplexed by at least one of a wavelength-division multiplexing scheme and a time-division multiplexing scheme; and a control signal line coupling the plurality of nodes to each other so as to circulate a control signal including a management table indicating at least one of a time slot and a wavelength of a signal used for communication in the data signal line, wherein each node inputs the control signal circulating through the control signal line, selects at least one of a time slot and a wavelength of a signal which is not used for communication, on the basis of the management table of the input control signal, performs communication through the data signal line by using at least selected one of the time slot and the wavelength of the selected signal, and updates the management table and outputs the table to the control signal line.

In addition, there is provided a communication method in a communication system constituted by a plurality of nodes, a data signal line, coupling the plurality of nodes to each other, for performing communication by using a signal multiplexed by at least one of a wavelength-division multiplexing scheme and a time-division multiplexing scheme, and a control signal line coupling the plurality of nodes to each other, comprising the steps of:

circulating a control signal in the control signal line, the control signal including a management table indicating at least one of a time slot and a wavelength of a signal used for communication in the data signal line;

inputting, at one of the nodes, the control signal circulating in the control signal line;

selecting, at one of the nodes, at least one of a time slot and a wavelength of a signal which is not used for communication, on the basis of the management table of the input control signal;

performing, at one of the nodes, communication through the data signal line by using at least selected one of the wavelength and the time slot of the selected signal; and updating the management table to be outputted to the control signal line at one of the nodes.

BRIEF DESCRIPTION OF THE DRAWINGS

FIGS. 6A to 6C are charts for explaining the manner in which the management table is updated in the communication method of the present invention;

DETAILED DESCRIPTION OF THE PREFERRED EMBODIMENTS

[First Embodiment]

Figure 1:
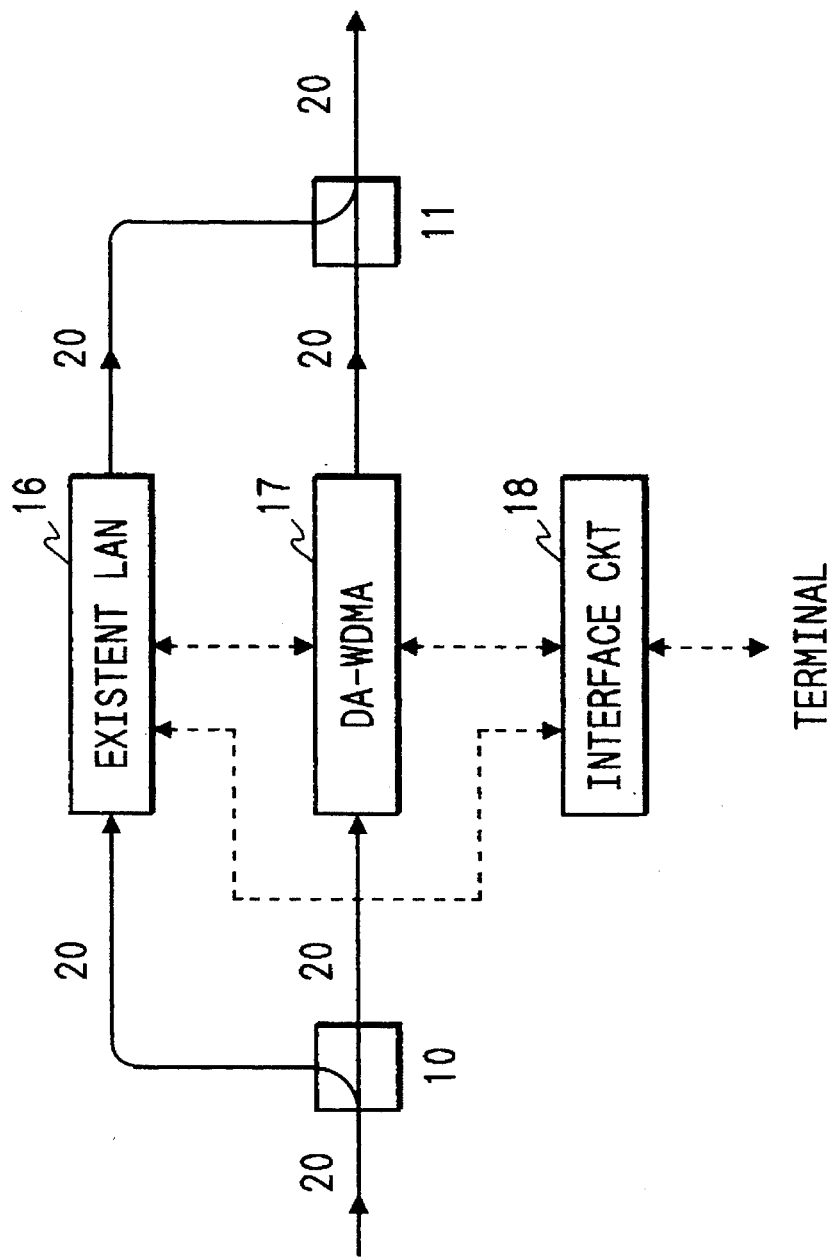
FIG. 1 is a block diagram showing an arrangement of a conventional node.
Figure 2:
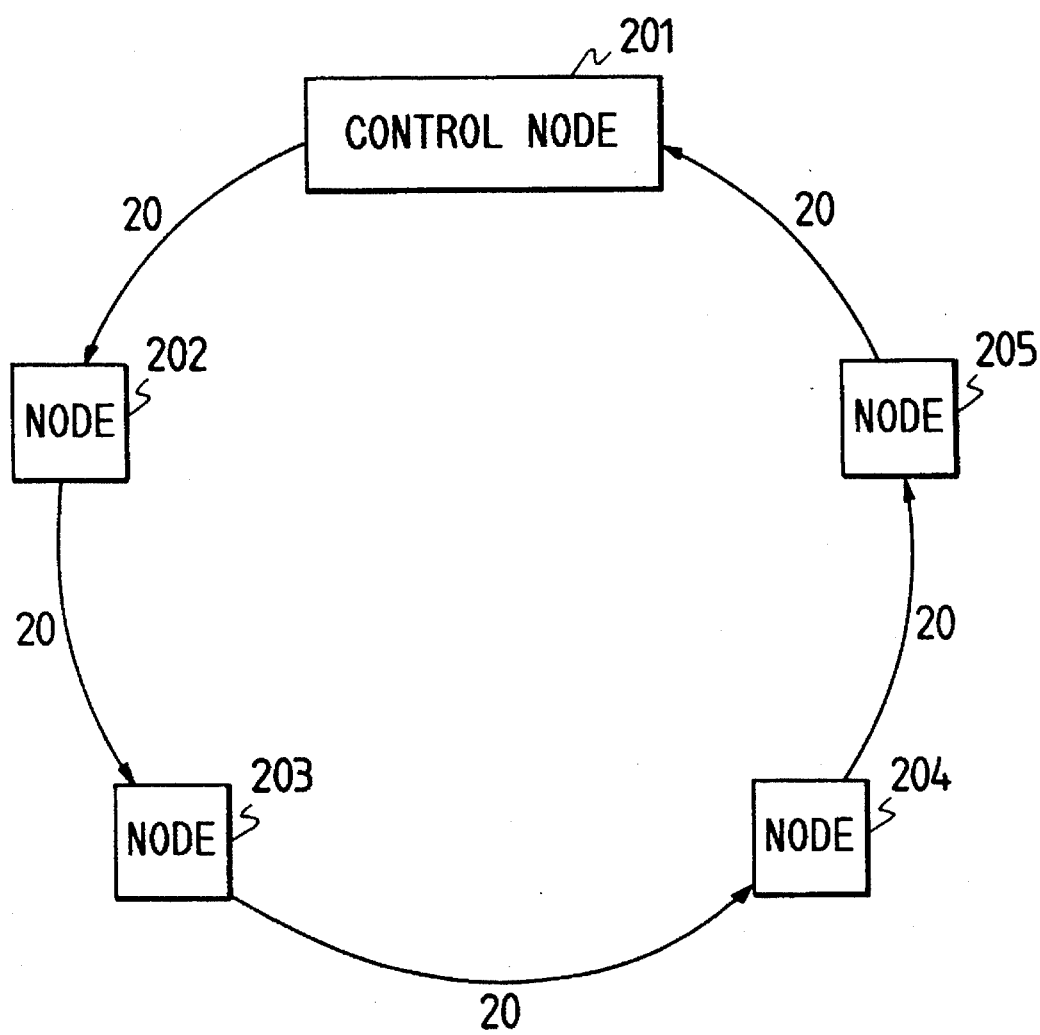
FIG. 2 is a block diagram showing an arrangement of a conventional communication system.
Figures 3, 4:
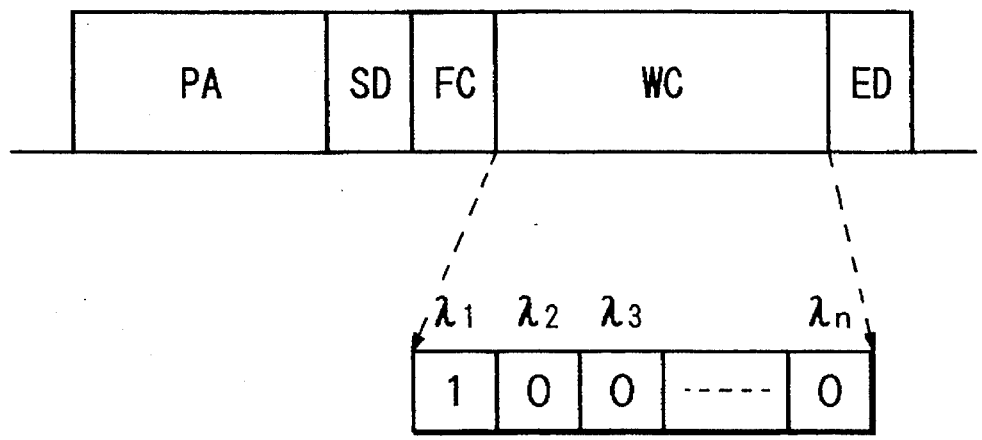
FIG. 3 is a chart showing a token used in a communication method of the present invention.
FIG. 4 is a management table used in the communication method of the present invention.
Figure 5:
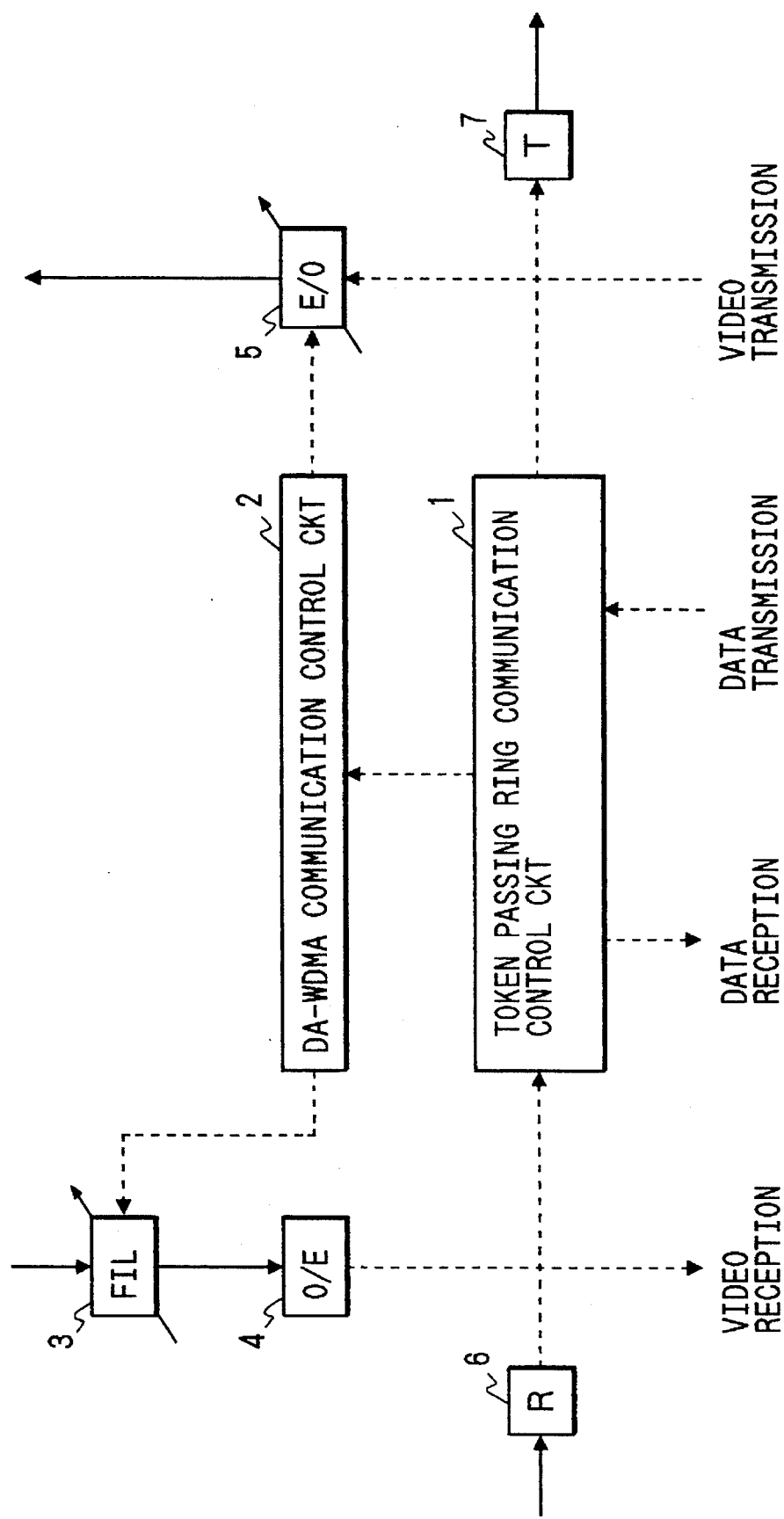
FIG. 5 is a block diagram showing the first embodiment of a node used in the communication system of the present invention.
Figure 7:
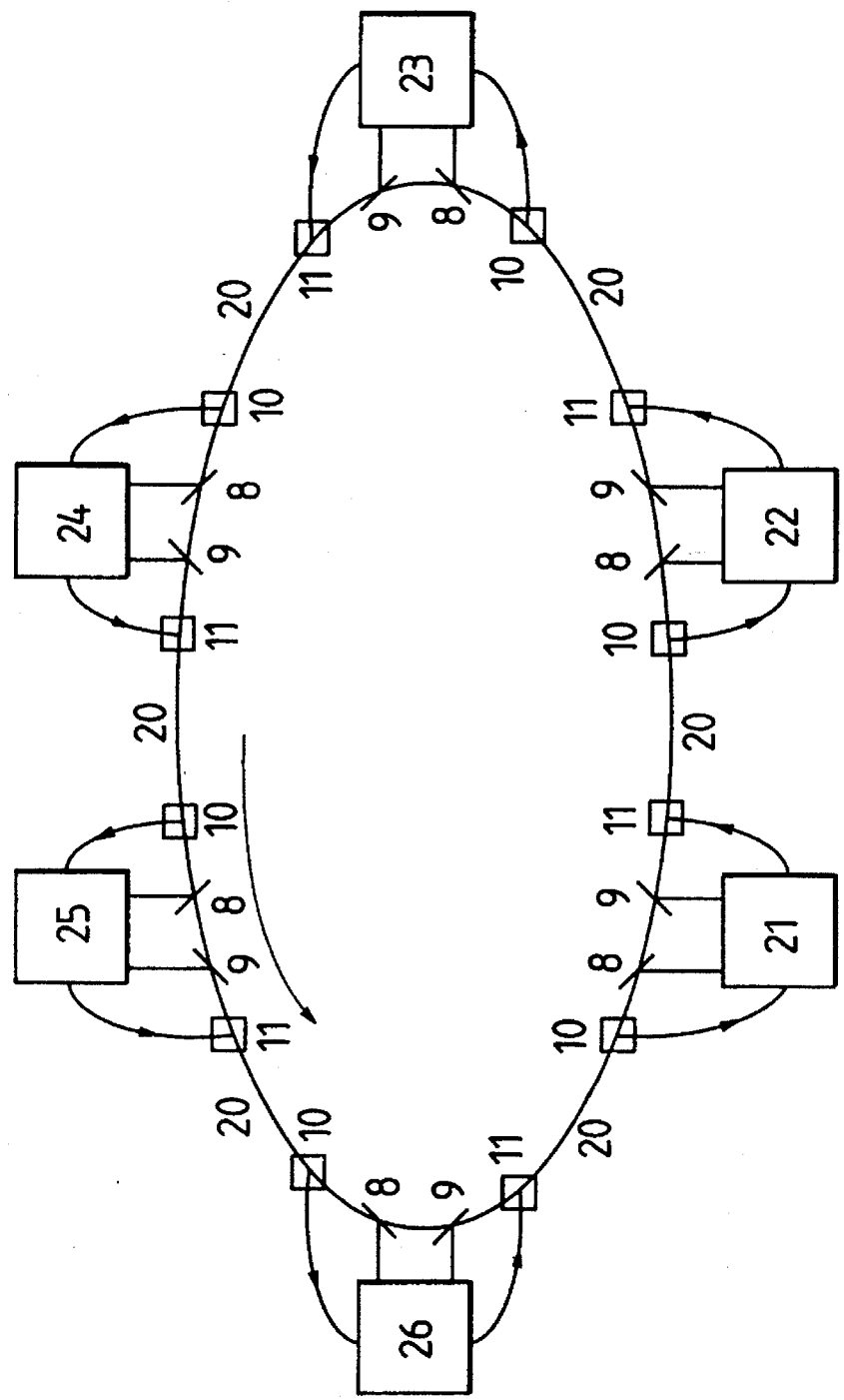
FIG. 7 is a block diagram showing the first embodiment of the communication system of the present invention.

FIGS. 3 to 7 are views for explaining the first embodiment of the present invention. FIG. 3 shows the arrangement of a token in a token passing scheme. FIG. 4 shows an example of a management table. FIG. 5 shows an electric interface section in the first embodiment of an optical node. FIGS. 6A to 6C are charts showing the manner in which the management table is updated. FIG. 7 shows the first embodiment of the network arrangement of the communication system of the present invention.

The format of the token in the present invention will be described first. Referring to FIG. 3, the token includes a portion PA (Preamble) as a synchronization pattern portion for extracting a clock, a portion SD (Starting Delimiter) indicating the start of the token, a portion FC (Frame Control) as a frame control portion, a portion WC (Wavelength Control) as a line management table, and a portion ED (Ending Delimiter) indicating the end of the token. The line management table WC is constituted by bits larger in number than the wavelengths used in the network. Each bit is assigned to a corresponding one of the wavelengths to indicate whether each wavelength is currently used. If, for example, a wavelength $\lambda_1$ is in use, the bit assigned to the wavelength $\lambda_1$ is set to "1". Otherwise, the bit is set to "0". If a line is divided by a time-division scheme in each wavelength, a table showing time slots may be prepared, the bit assigned to each time slot in use may be set to "1", and the bit assigned to each time slot not currently in use may be set to "0", as shown in FIG. 4. The portions PA, SD, FC, and ED constitute a token for use in an existing token passing scheme. However, the present invention is not limited to this arrangement. In addition, the line management table WC need not be set at the position in FIG. 3 and need only serve as a constituent part of the token.

Each optical node and a network arrangement in the present invention will be described next. Referring to FIGS. 5 and 7, each optical node includes a communication control circuit 1 of the token passing scheme, a communication control circuit 2 of a demand-assign wavelength-division multiplexing access scheme, a wavelength tunable filter 3 for extracting an optical signal having an arbitrary wavelength from optical signals of a plurality of wavelengths, an O/E converter 4 for converting an optical signal into an electrical signal, a tunable E/O converter 5 for converting an electrical signal into an optical signal having an arbitrary wavelength, an optical or electric receiver 6, an optical or electric transmitter 7, a coupler 8 for branching an optical signal, a coupler 9 for merging optical signals, an optical demultiplexer 10 for separating a signal having a specific wavelength from signals of a plurality of wavelengths, and allowing the signals of the remaining wavelengths to pass therethrough, and a multiplexer 11 for sending optical signals having different wavelengths onto one transmission path.

The wavelength tunable filter 3 is an element or a device capable of changing the passing wavelength in accordance with the value of a current flowing in a wavelength control terminal. For example, a filter having a DFB (distributed feed back) laser structure can be used as the wavelength tunable filter 3. The tunable E/O converter 5 is an element or a device capable of changing the oscillation wavelength in accordance with the value of a current flowing in the wavelength control terminal. For example, a DFB laser or a DBR (distributed Bragg reflection) laser can be used as the tunable E/O converter 5. As the O/E converter 4, a PIN-PD (photodiode) or an APD (avalanche photodiode) is used. In this embodiment, the optical receiver 6 uses an O/E converter, and the optical transmitter 7 uses an E/O converter. Referring to FIG. 5, each solid line indicates an optical transmission path or an optical signal; and each broken line, an electrical transmission path or an electrical signal. FIG. 7 shows the first embodiment of the network arrangement of the communication system. In this arrangement, a plurality of nodes are connected to a loop type network through couplers, demultiplexers, and multiplexers.

A communication operation will be described next. Assume that a video signal is being communicated from a node 22 to a node 25 by using the wavelength $\lambda_1$, and a file with a large quantity of information is being transmitted from a node 24 to a node 26 by using a wavelength $\lambda_3$. In this case, when video communication is to be performed from a node 21 to the node 25, a communication operation is performed in the following manner.

The node 21 acquires a token by the token passing scheme to acquire a video transmission right and perform line assignment. In the token passing scheme, a signal called a token, which gives a data transmission right, is circulated in the network. Upon reception of the token, a node outputs a self-address, a destination address, and data, in the form of a packet signal, to an optical transmission path 20. Each node checks whether the destination address coincides with the self-address. If they coincide with each other, the node receives the signal. Communication is performed in this manner. The token shown in FIG. 3 has a wavelength $\lambda_a$ and circulates in one direction in the ring-like network. In each node, the token is extracted by separating it from optical signals of other wavelengths through the optical demultiplexer 10. The token is then regenerated/relayed to be sent onto the optical transmission path 20 through the multiplexer 11.

The node 21 extracts the token by separating it from optical signals of other wavelengths ($\lambda_1$ and $\lambda_3$) through the optical demultiplexer 10. The token is then received by the optical receiver 6 and is loaded in the communication control circuit 1 of the token passing Ring scheme. The communication control circuit 1 checks whether any free wavelengths are present in the line management table WC of the token, and selects a wavelength which is not in use. For example, in the case shown in FIG. 6A, since the wavelengths $\lambda_1$ and $\lambda_3$ are in use (the bits assigned to the wavelengths $\lambda_1$ and $\lambda_3$ are set to "1"), a wavelength $\lambda_2$ is selected. The node 21 writes the self-address, the address of the destination node 25, and information indicating the selected wavelength $\lambda_2$ in a packet, and outputs the packet upon converting it into an optical signal having the wavelength $\lambda_a$ through the optical transmitter 7. The optical signal is then sent onto the optical transmission path 20 through the multiplexer 11. In addition, the line management table WC of the token is updated (setting the bit assigned to the wavelength $\lambda_2$ to "1"), as shown in FIG. 6B. Similarly, the line management table WC is converted into an optical signal having the wavelength $\lambda_a$. The optical signal is then output after the above-mentioned packet. The communication control circuit 1 informs the set wavelength $\lambda_2$ to the communication control circuit 2 of the demand-assign wavelength-division multiplexing access scheme. The communication control circuit 2 controls the tunable E/O converter 5 to set the transmission wavelength to $\lambda_2$.

The token and the packet transmitted from the node 21 are input to the node 25 through the nodes 22, 23, and 24, and are converted into electrical signals by the optical receiver 6. The signals are then loaded in the communication control circuit 1. The communication control circuit 1 reads the destination address in the packet to confirm that the packet is sent to the self-node, and informs the reception wavelength written in the data to the communication control circuit 2. Since the node 25 is receiving the video signal from the node 22, the communication control circuit 2 maintains the current setting of the filter 3 until the communication is completed. Instead of waiting for the end of the communication, the node 25 may inform the node 21 that a receiving operation is being performed.

When the communication from the node 22 is completed, the communication control circuit 2 controls the wavelength tunable filter 3 to set the passing wavelength to $\lambda_2$, and informs, to the communication control circuit 1 of the token passing ring scheme of the completion of a preparation for reception. Upon acquiring the token, the communication control circuit 1 writes the address of the self-node 25, address of the destination node 21, and transmission request data in a packet, and converts the packet into an optical signal having the wavelength $\lambda_a$ through the optical transmitter 7. The optical signal is then sent to the optical transmission path 20 through the multiplexer 11. The packet is input to the communication control circuit 1 of the node 21 through the node 26. The communication control circuit 1 sends the transmission request to the terminal to cause it to start transmission of the video data.

The tunable E/O converter 5 of the node 21 converts the video signal into an optical signal having the wavelength $\lambda_2$, which is output. The optical signal is sent to the optical transmission path through the coupler 9 and is output to the optical transmission path 20 through the multiplexer 11. The optical signal is transmitted along the optical transmission path 20 through the optical demultiplexer 10, the couplers 8 and 9, and the multiplexer 11 which are connected to the optical transmission path 20. Although the signal keeps circulating in the network, no problems are posed in communication, if the intensity of the optical signal which has circulated in the loop once is sufficiently smaller than the light intensity at the start of transmission to be negligible.

In each node, the token and a packet are filtered by the optical demultiplexer 10 to be extracted, and part of a signal with a large quantity of information is branched by the coupler 8 to be extracted. The signals with large quantities of data, having the wavelengths $\lambda_2$ and $\lambda_3$, are currently transmitted in the network, and each node extracts two optical signals through the coupler 8. However, in the node 25, since the reception wavelength of the wavelength tunable filter 3 has already been set to $\lambda_2$, only the video signal having the wavelength $\lambda_2$ passes through the filter 3, and is converted into an electrical signal by the O/E converter 4 to be received. In the remaining nodes, since the wavelength tunable filters are not set, the signals with large quantities of data are not received.

The procedure for finishing communication will be described next. When the communication of the video data is completed, the node 21 extracts the token and updates the line management table WC. In this case, as shown in FIG. 6C, after the bit assigned to the wavelength $\lambda_2$ is set to "0", the token is output to the optical transmission path 20. If node 25 needs to be informed of the end of communication information indicating the end of communication is written in the packet so to inform the node 25. When no video signal is received for a predetermined period of time or more, or when information indicating the end of the communication is received, the node 25 cancels the setting of the wavelength tunable filter 3 and finishes the communication.

Communication between other nodes is performed in the same manner as described above.

[Second Embodiment]

Figure 8:
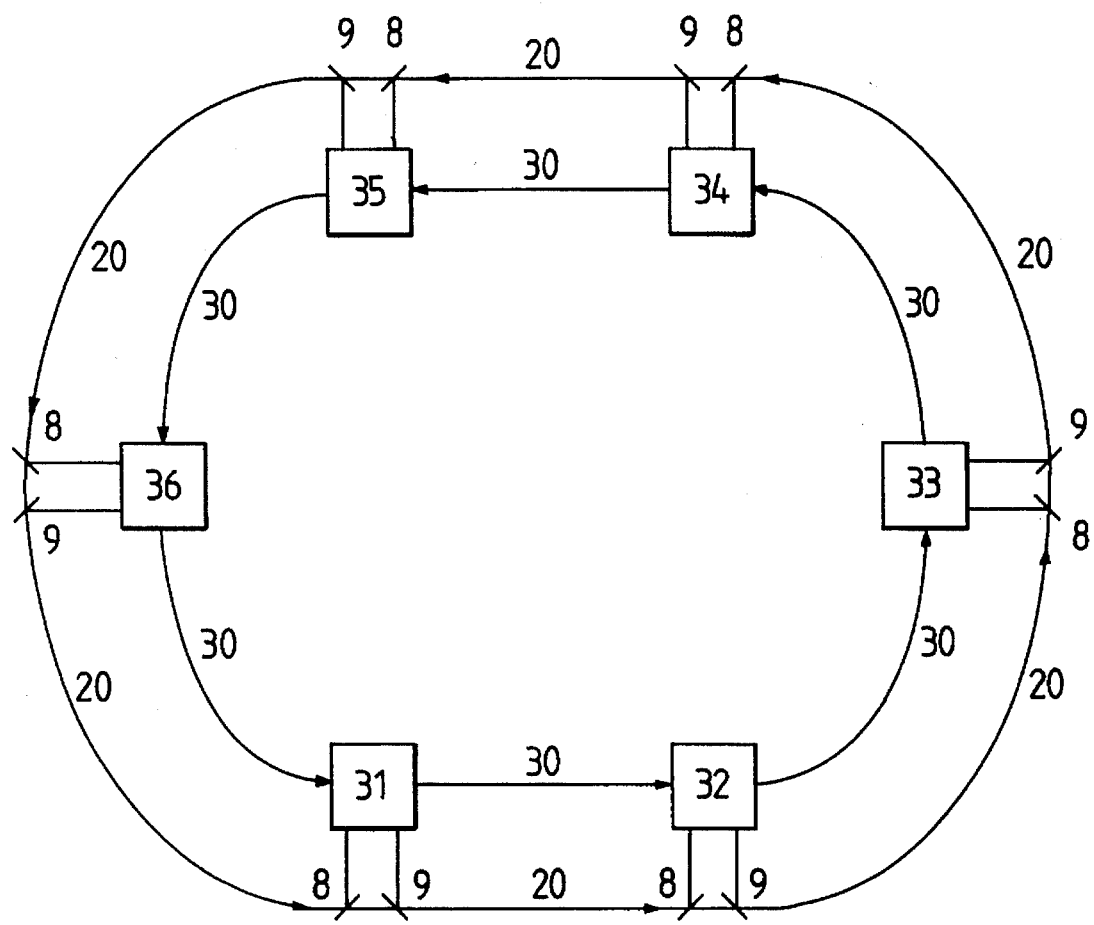
FIG. 8 is a block diagram showing the second embodiment of the communication system of the present invention.

FIG. 8 shows the network arrangement of the second embodiment of the communication system of the present invention. Referring to FIG. 8, this network arrangement includes an electrical or optical transmission path 30 and nodes 31 to 36, each identical to the node shown in FIG. 5. The same reference numerals in the second embodiment denote the same parts as in the first embodiment.

In the second embodiment, a wavelength control signal and a video signal are communicated through different loop type transmission paths, and the same operation as that in the first embodiment is performed. In addition, as a wavelength control signal, an optical signal or an electrical signal may be used. When the wavelength control signal is an optical signal, an optical transmission path may be used as the transmission path 30, and an optical receiver and an optical transmitter may be used as a receiver 6 and a transmitter 7, respectively. When the wavelength control signal is an electrical signal, an electrical transmission path may be used as the transmission path 30, and an electric receiver and an electric transmitter may be used as the receiver 6 and the transmitter 7, respectively.

[Third Embodiment]

Figure 9:
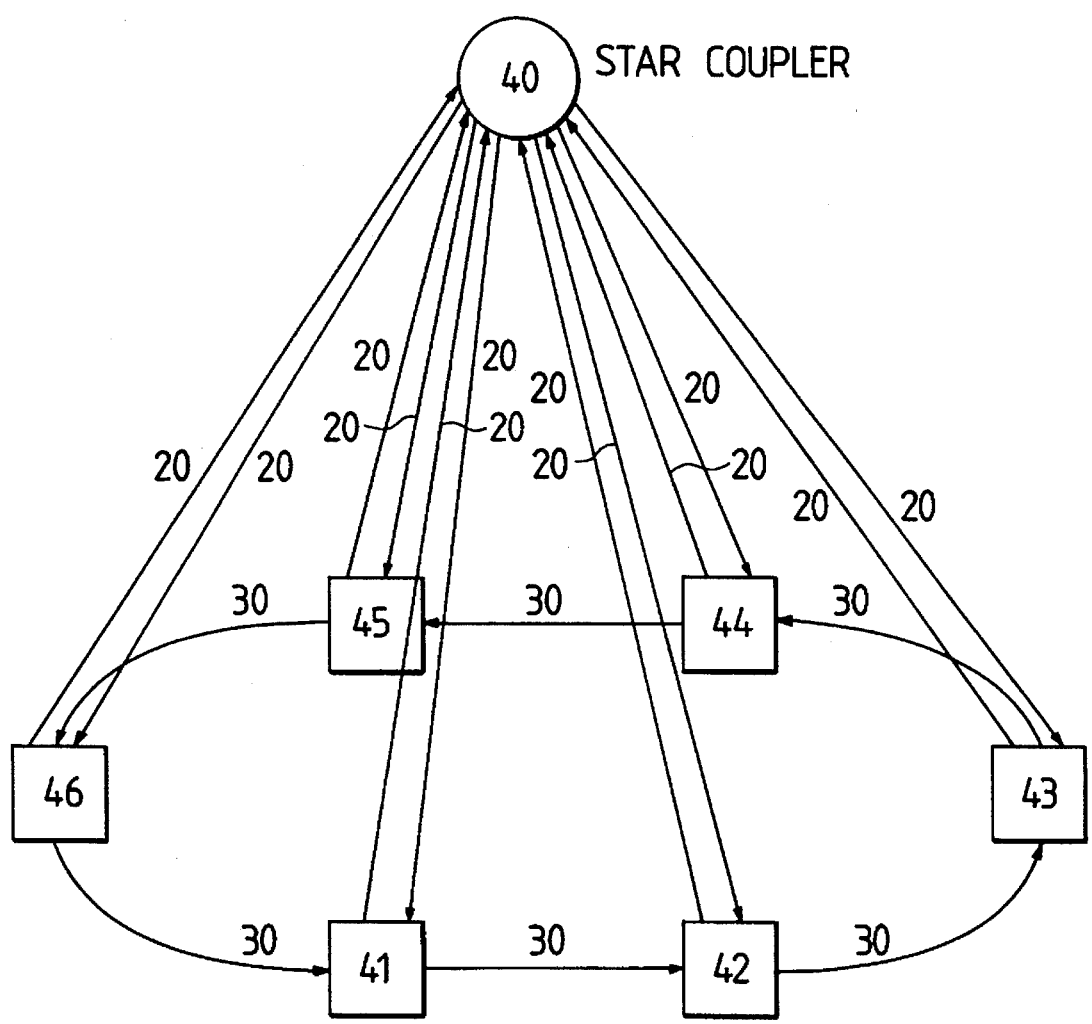
FIG. 9 is a block diagram showing the third embodiment of the communication system of the present invention.

FIG. 9 shows the network arrangement of the third embodiment of the communication system of the present invention. Referring to FIG. 9, this network arrangement includes a star coupler 40 and nodes 41 to 46, each identical to the node shown in FIG. 5. The same reference numerals in the third embodiment denote the same parts as in the above-described embodiment.

In the third embodiment, video lines are formed into a star network, and control lines through which a wavelength control signal are transmitted are formed into a loop type network. In this arrangement, the same operation as that in the first embodiment is performed. Similar to the second embodiment, as a wavelength control signal, an optical signal or an electrical signal may be used. When the wavelength control signal is an optical signal, an optical transmission path may be used as a transmission path 30, and an optical receiver and an optical transmitter may be used as a receiver 6 and a transmitter 7 of each node, respectively. When the wavelength control signal is an electrical signal, an electrical transmission path may be used as the transmission path 30, and an electric receiver and an electric transmitter may be used as the receiver 6 and the transmitter 7, respectively.

A communication operation will be described next. Similar to the first embodiment, assume that a video signal is being communicated from the node 42 to the node 45 by using a wavelength $\lambda_1$, and a file with a large quantity of data is being transmitted from the node 44 to the node 46 by using a wavelength $\lambda_3$. In this case, when video communication is to be performed from the node 41 to the node 45, a communication operation is performed in the following manner. Similar to the first embodiment, line assignment is performed through a loop type control line, and video communication from the node 41 to the node 45 is performed by using a wavelength $\lambda_2$. When a request to transmit a video signal is transmitted from the node 45, an E/O converter 5 of the node 41 converts the video signal into an optical signal having the wavelength $\lambda_2$, and this optical signal is output from the node 41 to an optical transmission path 20. The optical signal is equally branched by the star coupler 40 so as to be distributed to all the nodes through the optical transmission path 20. As a result, the signals with large quantities of data, having the wavelengths $\lambda_2$ and $\lambda_3$, are transmitted through the optical transmission path 20, and are input to a wavelength tunable filter 3 of the node 45. Since the reception wavelength of the wavelength tunable filter 3 has already been set to $\lambda_2$, only the video signal having the wavelength $\lambda_2$ passes through the wavelength tunable filter 3 and is converted into an electrical signal by an O/E converter 4 to be received. Since the filters 3 of the remaining nodes are not set, the video signal is not received.

The communication is finished in the same manner as in the first embodiment. When the communication of the video signal is finished, the node 41 extracts the token, and updates a line management table WC. When a video signal is not received for a predetermined period of time or more, or when information indicating the end of the communication is received, the node 45 cancels the setting of the wavelength tunable filter 3 and finishes the communication.

Communication between other nodes is performed in the same manner as described above.

[Fourth Embodiment]

Figure 10:
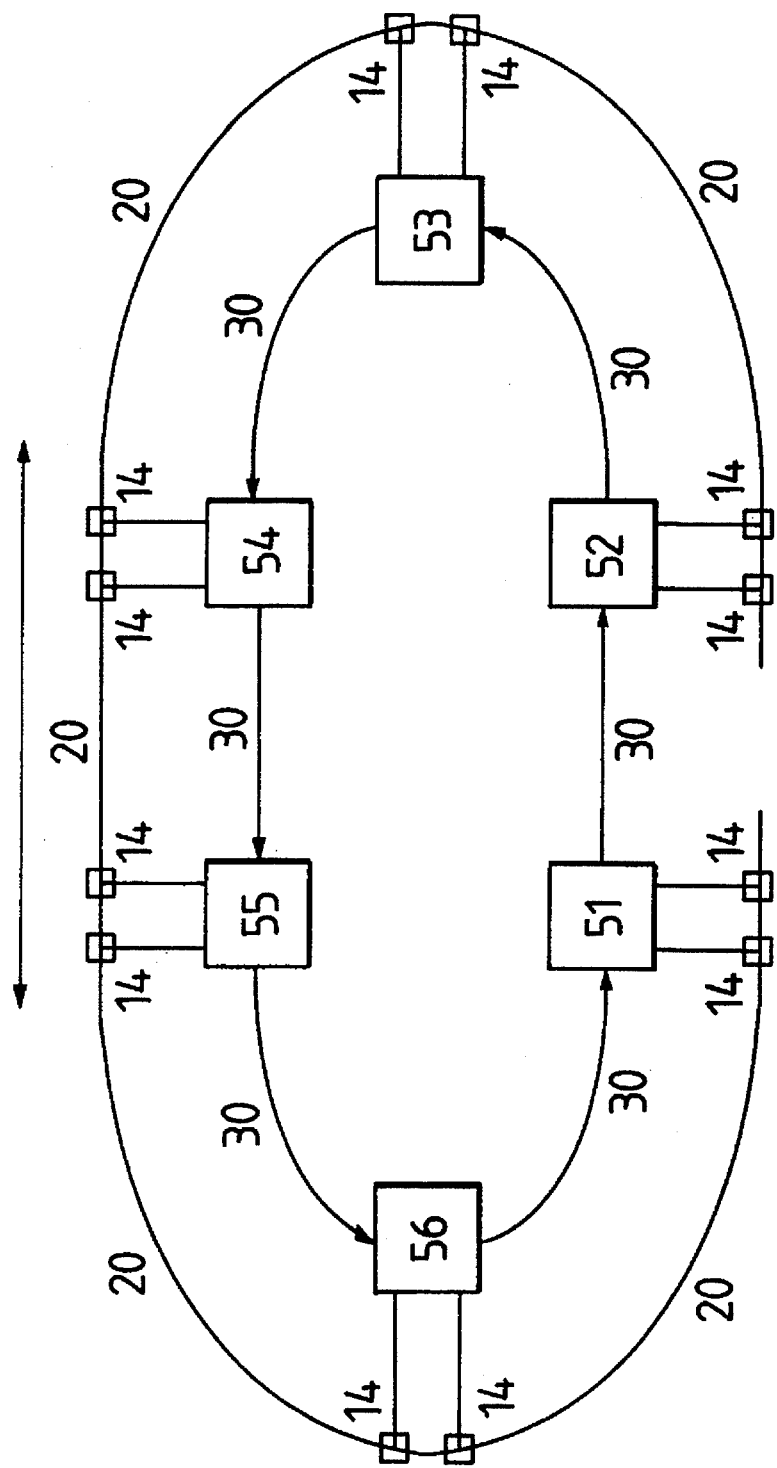
FIG. 10 is a block diagram showing the fourth embodiment of the communication system of the present invention.

FIG. 10 shows the network arrangement of the fourth embodiment of the communication system of the present invention. Referring to FIG. 10, this network arrangement includes a coupler for bidirectional transmission 14 and nodes 51 to 56, each identical to the node shown in FIG. 5. The same reference numerals in the fourth embodiment denote the same parts as in the above-described embodiment.

In the fourth embodiment, video lines are formed into a bus type network, and control lines are formed into a loop type network. In this arrangement, the same operation as that in the first embodiment is performed. Similar to the second embodiment, as a wavelength control signal, an optical signal or an electrical signal may be used. When the wavelength control signal is an optical signal, an optical transmission path may be used as a transmission path 30, and an optical receiver and an optical transmitter may be used as a receiver 6 and a transmitter 7 of each node, respectively. When the wavelength control signal is an electrical signal, an electrical transmission path may be used as the transmission path 30, and an electric receiver and an electric transmitter may be used as the receiver 6 and the transmitter 7, respectively.

A communication operation will be described next. Similar to the first embodiment, assume that a video signal is being communicated from the node 52 to the node 55 by using a wavelength $\lambda_1$, and a file with a large quantity of data is being transmitted from the node 54 to the node 56 by using a wavelength $\lambda_3$. In this case, when video communication is to be performed from the node 51 to the node 55, a communication operation is performed in the following manner. Similar to the first embodiment, line assignment is performed through a loop type control line network, and video communication from the node 51 to the node 55 is performed by using a wavelength $\lambda_2$. When a request to transmit a video signal is transmitted from the node 55, an E/O converter 5 of the node 51 converts the video signal into an optical signal having the wavelength $\lambda_2$, and this optical signal is output from the node 51 to an optical transmission path 20 through the coupler 14. The video signal is then transmitted through the optical transmission path 20 in two directions, and part of the signal is branched by the coupler 14 in each node to be extracted, while the remaining portion of each signal passes through the coupler 14 to be transmitted to a corresponding end of the optical transmission path 20.

Consequently, the signals with large quantities of data, having the wavelengths $\lambda_2$ and $\lambda_3$, are transmitted through the optical transmission path 20 and are input to the node 55. Since the reception wavelength of a wavelength tunable filter 3 of the node 55 has already been set to $\lambda_2$, only the video signal having the wavelength $\lambda_2$ passes through the wavelength tunable filter 3 and is converted into an electrical signal by an O/E converter 4 to be received. Since the filters 3 of the remaining nodes are not set, although the video signal is extracted, the signal is not received by these nodes.

The communication is finished in the same manner as in the first embodiment. When the communication of the video signal is finished, the node 51 extracts the token, and updates a line management table WC. When a video signal is not received for a predetermined period of time or more, or when information indicating the end of the communication is received, the node 55 cancels the setting of the wavelength tunable filter 3 and finishes the communication.

Communication between other nodes is performed in the same manner as described above.

[Fifth Embodiment]

Figure 11:
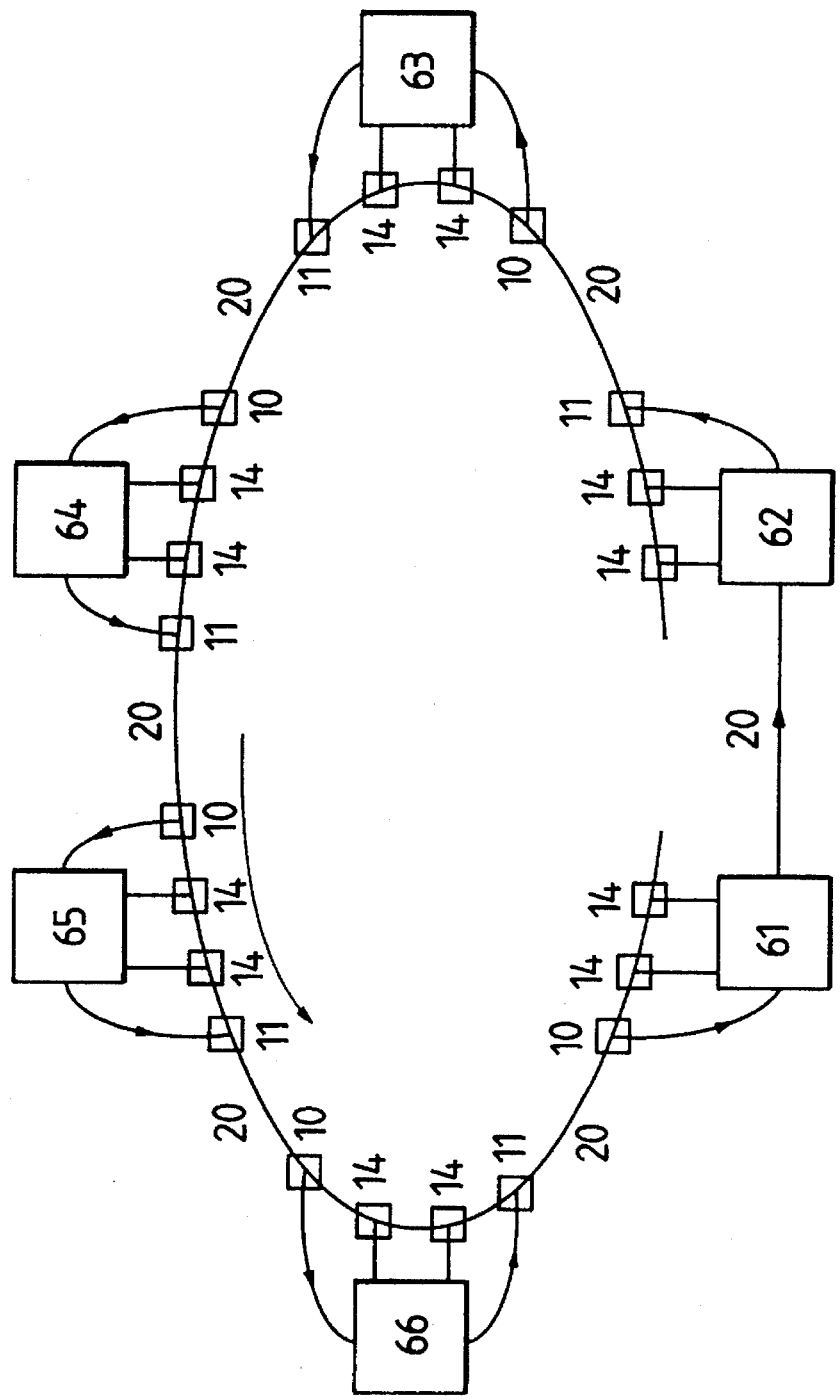
FIG. 11 is a block diagram showing the fifth embodiment of the communication system of the present invention.

FIG. 11 shows the network arrangement of the fifth embodiment of the communication system of the present invention. Referring to FIG. 11, this network arrangement includes nodes 61 to 66, each identical to the node shown in FIG. 5. The same reference numerals in the fifth embodiment denote the same parts as in the above-described embodiment. In the fifth embodiment, video lines are formed into a bus type network, and control lines are formed into a loop type network. These networks are accommodated in one optical transmission path through optical demultiplexers 10 and multiplexers 11. In this arrangement, the same operation as that in the fourth embodiment is performed. In the fifth embodiment, since the wavelength control signal is an optical signal, an optical transmission path is used as a transmission path 20, and an optical receiver and an optical transmitter are respectively used as a receiver 6 and a transmitter 7.

[Sixth Embodiment]

Figure 12:
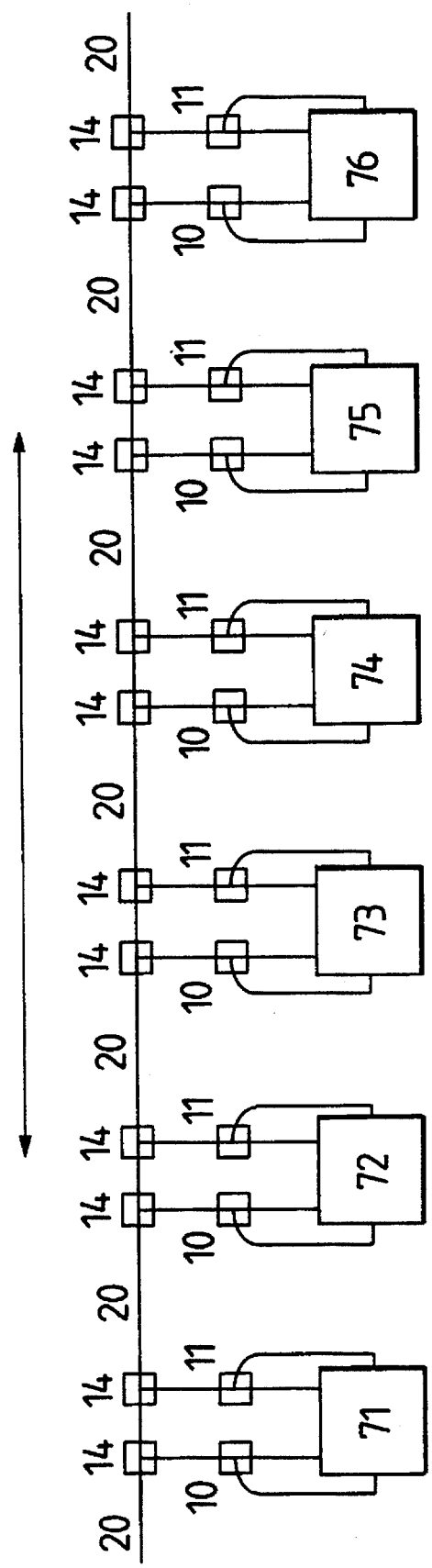
FIG. 12 is a block diagram showing the sixth embodiment of the communication system of the present invention.

FIG. 12 shows the network arrangement of the sixth embodiment of the communication system of the present invention. Referring to FIG. 12, this network arrangement includes nodes 71 to 76, each identical to the node shown in FIG. 5. The same reference numerals in the fifth embodiment denote the same parts as in the above-described embodiment. In the sixth embodiment, both a set of video lines and a set of control lines are formed into bus type networks and are accommodated in one optical transmission path. In this arrangement, the same operation as that in the first embodiment is performed. In the sixth embodiment, since a control line protocol is of a token passing bus scheme, a circuit 1 in each node is a communication control circuit of the token passing scheme. In addition, since the wavelength control signal is an optical signal, an optical transmission path is used as a transmission path 20, and an optical receiver and an optical transmitter are respectively used as a receiver 6 and a transmitter 7.

A communication operation will be described next. Assume that a video signal is being communicated from the node 72 to the node 75 by using a wavelength $\lambda_1$, and a file with a large quantity of data is being transmitted from the node 74 to the node 76 by using a wavelength $\lambda_3$. In this case, when video communication from the node 71 to the node 75 is to be performed, a communication operation is performed in the following manner. In order to perform video transmission right and line assignment, the node 71 acquires a token by the token passing bus scheme. In the token passing bus scheme, a logical ring is formed, and the order in which the token is passed is determined in advance. The token has a wavelength $\lambda_a$ and circulates in the bus type network. At each node, part of the token is branched by a coupler 14 and is separated from optical signals having other wavelengths by a demultiplexer 10 to be extracted. Upon reception of the token through an optical receiver 6, the node 71 causes the communication control circuit 1 of the token passing bus scheme to check whether any free wavelengths are present in a wavelength table WC of the token, and selects a wavelength which is not used. In this case, since the wavelengths $\lambda_1$ and $\lambda_3$ are in use (the bits assigned to the wavelengths $\lambda_1$ and $\lambda_3$ are set to "1"), a wavelength $\lambda_2$ is selected. The node 71 then writes the address of the self-node 71, the address of the destination node 75, and the information indicating the selected wavelength $\lambda_2$ in a packet, and outputs the packet upon converting it into an optical signal having the wavelength $\lambda_a$ through an optical transmitter 7. The optical signal is sent to the optical transmission path 20 through a multiplexer 11 and the coupler 14.

In addition, the node 71 updates the line management table WC of the token (sets the bit assigned to the wavelength $\lambda_2$ to "1"), and converts the token into an optical signal having the wavelength $\lambda_a$ in the same manner as described above. This optical signal is transmitted after the packet. The communication control circuit 1 of the token passing bus scheme informs, to a communication control circuit 2 of the demand-assign wavelength-division multiplexing access scheme of the set wavelengths $\lambda_2$. The communication control circuit 2 then controls a tunable E/O converter 5 to set the wavelength $\lambda_2$.

The token and the packet sent from the node 71 are input to the node 75 through the optical transmission path 20. The token and the packet are then converted into electrical signals by the optical receiver 6 and are loaded in the communication control circuit 1. The communication control circuit 1 of the token passing bus scheme reads the destination address in the packet. Upon confirming that the packet is sent to the self-node, the communication control circuit 1 informs the communication control circuit 2 of the wavelength-division multiplexing access scheme of the reception wavelength written in the packet. Since the node 75 is receiving the video signal from the node 72, the node 75 maintains the current setting of a filter 3 until the communication is finished. Instead of this operation, the node 75 may inform the node 71 that reception is being performed. When the communication from the node 72 is completed, the communication control circuit 2 of the node 75 controls the wavelength tunable filter 3 to set the passing wavelength to $\lambda_2$, and informs, the communication control circuit 1 of the token passing bus scheme of the completion of a preparation for reception.

Upon acquiring the token, the communication control circuit 1 of the token passing bus scheme writes self-address 75, destination address 71, and transmission request data in a packet, and converts the packet into an optical signal having the wavelength $\lambda_a$ through the optical transmitter 7. The optical signal is then sent to the optical transmission path 20 through the multiplexer 11 and the coupler 14. The packet passes through the optical transmission path 20 and is input to the communication control circuit 1 of the node 71. The communication control circuit 1 of the node 71 supplies the transmission request to a terminal to cause it to start transmission of a video signal. The tunable E/O converter 5 converts the video signal into an optical signal having the wavelength $\lambda_2$, and outputs it from the node 71. The optical signal is then sent to the optical transmission path 20 through the multiplexer 11 and the coupler 14. The optical signal is transmitted in two directions through the optical transmission path 20. Each signal passes through the coupler 14 connected to the optical transmission path 20 to be transmitted to a corresponding end of the transmission path 20.

Consequently, the signals with large quantities of data, having the wavelengths $\lambda_2$ and $\lambda_3$, are currently transmitted in the network. In each node, these optical signals are extracted through the coupler 14 and the optical demultiplexer 10. Since the reception wavelength of a wavelength tunable filter 3 of the node 75 has already been set to $\lambda_2$, only the video signal having the wavelength $\lambda_2$ passes through the wavelength tunable filter 3 and is converted into an electrical signal by an O/E converter 4 to be received. Since the filters 3 of the remaining nodes are not set, no signal with a large quantity of data is received by these nodes.

The communication is finished in the same manner as in the first embodiment. When the communication of the video signal is finished, the node 71 extracts the token, and updates a line management table WC. When a video signal is not received for a predetermined period of time or more, or when information indicating the end of the communication is received, the node 75 cancels the setting of the wavelength tunable filter 3 and finishes the communication.

Communication between other nodes is performed in the same manner as described above.

[Seventh Embodiment]

Figure 13:
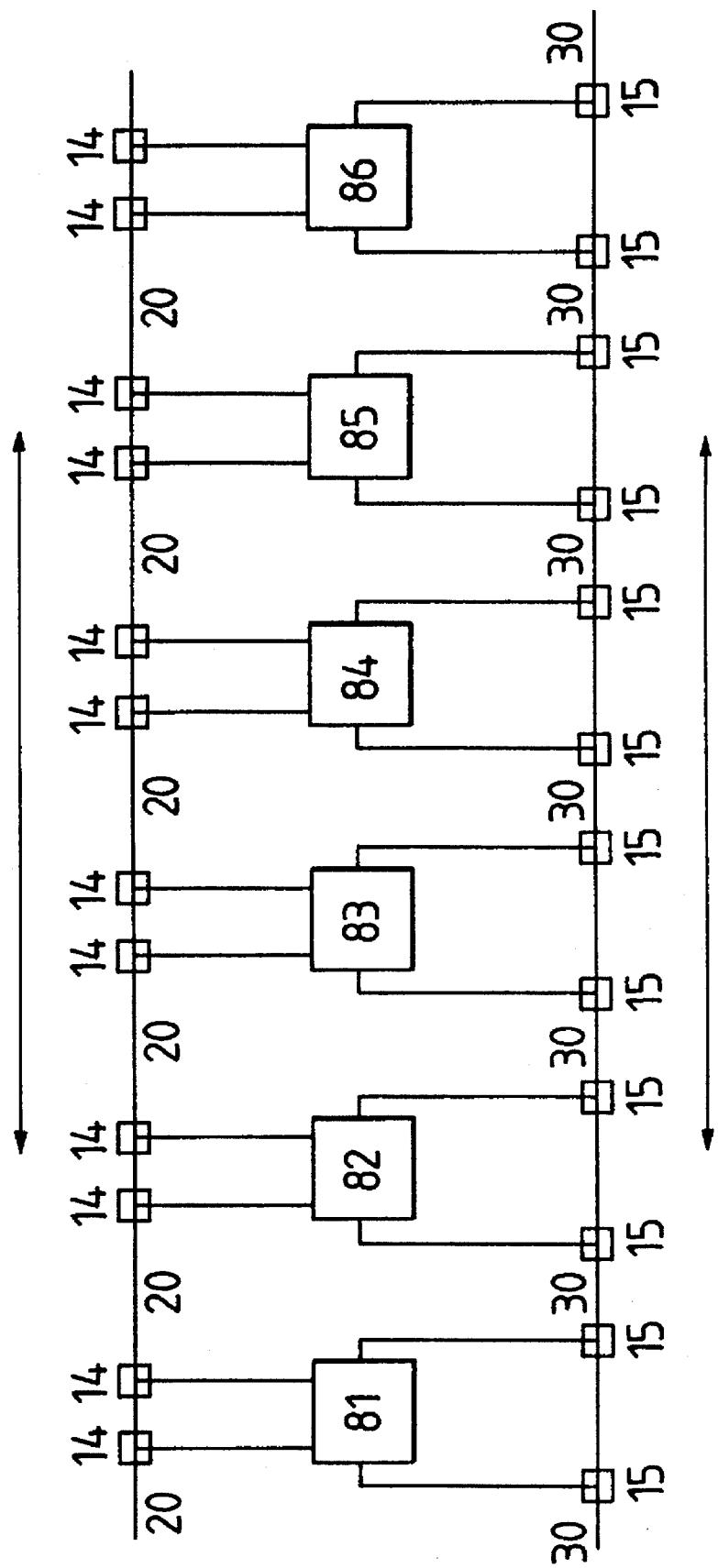
FIG. 13 is a block diagram showing the seventh embodiment of the communication system of the present invention.

FIG. 13 shows the network arrangement of the seventh embodiment of the communication system of the present invention. Referring to FIG. 13, this network arrangement includes an optical or electrical coupler 15 and nodes 81 to 86, each identical to that shown in FIG. 5. The same reference numerals in the seventh embodiment denote the same parts as in the above-described embodiment. In the seventh embodiment, a set of video lines and a set of control lines are accommodated in different bus type transmission paths, respectively. In this arrangement, the same operation as that in the sixth embodiment is performed. In addition, as a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical coupler for bidirectional transmission may be used as the coupler 15. When the wavelength control signal is an electrical signal, an electrical transmission path may be used as the transmission path 30; an electric receiver and an electric transmitter may be used as the receiver 6 and the transmitter 7, respectively; and an electrical coupler for bidirectional transmission may be used as the coupler 15.

[Eighth Embodiment]

Figure 14:
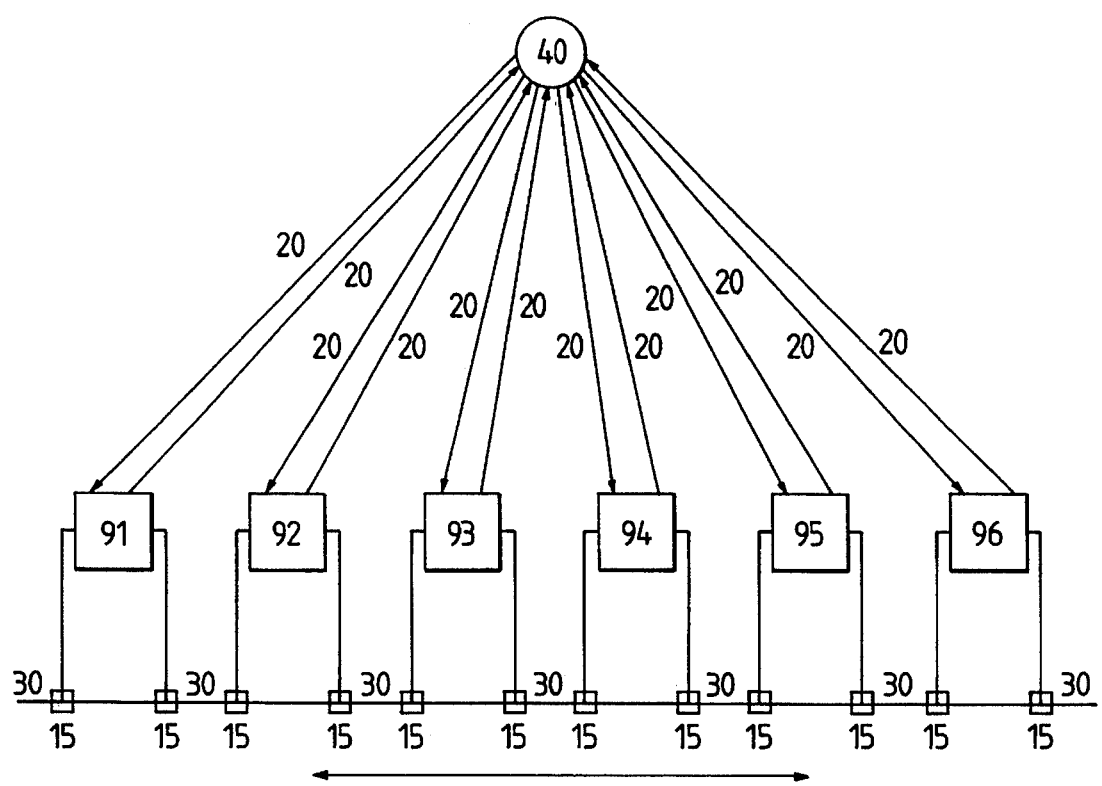
FIG. 14 is a block diagram showing the eighth embodiment of the communication system of the present invention.

FIG. 14 shows the network arrangement of the eighth embodiment of the communication system of the present invention. Referring to FIG. 14, this network arrangement includes nodes 91 to 96, each identical to that shown in FIG. 5. The same reference numerals in the eighth embodiment denote the same parts as in the above-described embodiment. In the eighth embodiment, video lines are formed into a star network to perform the same operation as the star type video line network in the third embodiment, and control lines are formed into a bus type network to perform the same operation as that of the bus type control line network in the seventh embodiment. Similar to the seventh embodiment, as a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical coupler for bidirectional transmission may be used as a coupler 15. When the wavelength control signal is an electrical signal, an electrical transmission path may be used as the transmission path 30; an electric receiver and an electric transmitter may be used as the receiver 6 and the transmitter 7, respectively; and an electrical coupler for bidirectional transmission may be used as the coupler 15.

[Ninth Embodiment]

Figure 15:
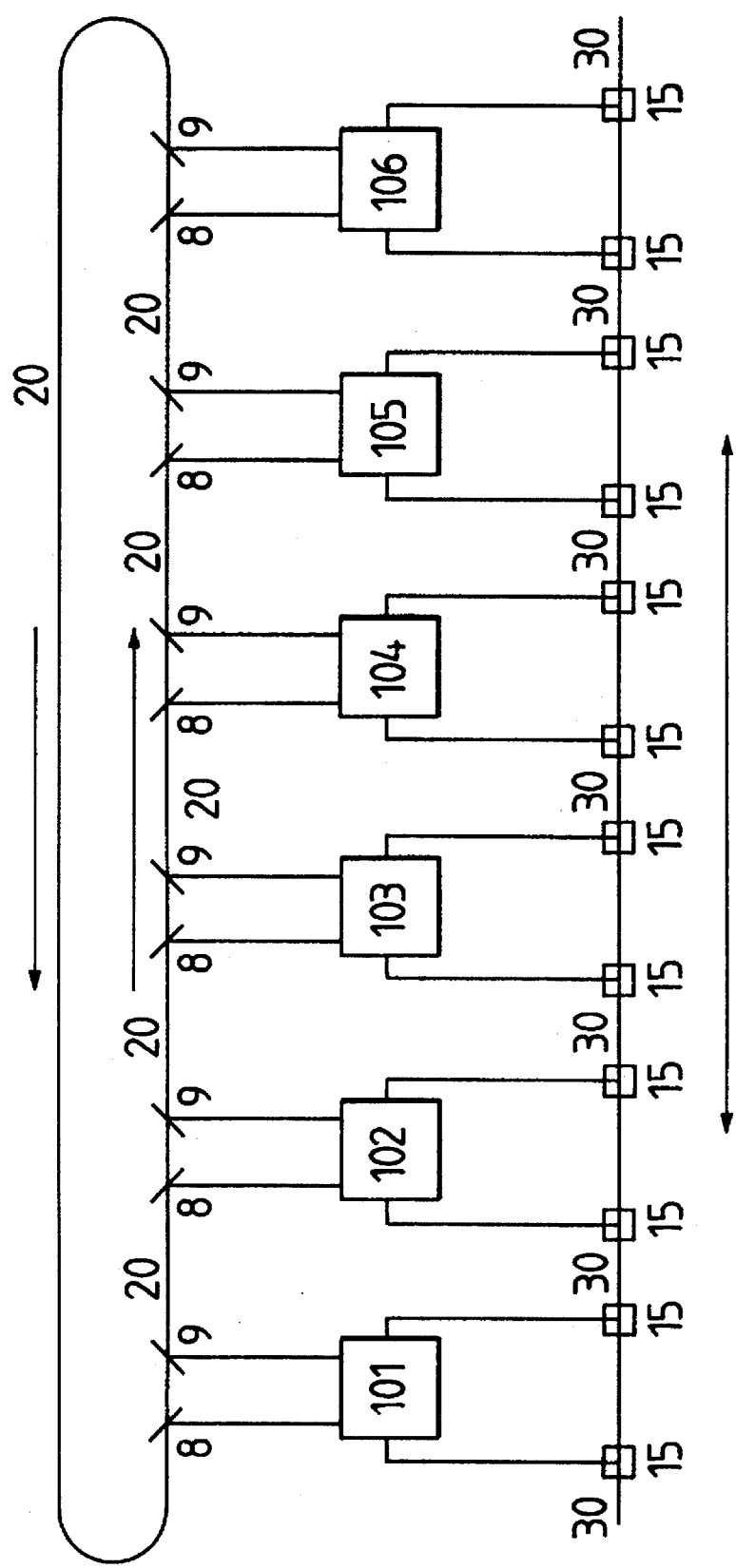
FIG. 15 is a block diagram showing the ninth embodiment of the communication system of the present invention.

FIG. 15 shows the network arrangement of the ninth embodiment of the communication system of the present invention. Referring to FIG. 15, this network arrangement includes nodes 101 to 106, each identical to that shown in FIG. 5. The same reference numerals in the ninth embodiment denote the same parts as in the above-described embodiment. In the ninth embodiment, video lines are formed into a loop type network to perform the same operation as the loop type video line network in the second embodiment, and control lines are formed into a bus type network to perform the same operation as that of the bus type control line network in the seventh embodiment. Similar to the seventh embodiment, as a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical coupler for bidirectional transmission may be used as a coupler 15. When the wavelength control signal is an electrical signal, an electrical transmission path may be used as the transmission path 30; an electric receiver and an electric transmitter may be used as the receiver 6 and the transmitter 7, respectively; and an electrical coupler for bidirectional transmission may be used as the coupler 15.

[Tenth Embodiment]

Figure 16:
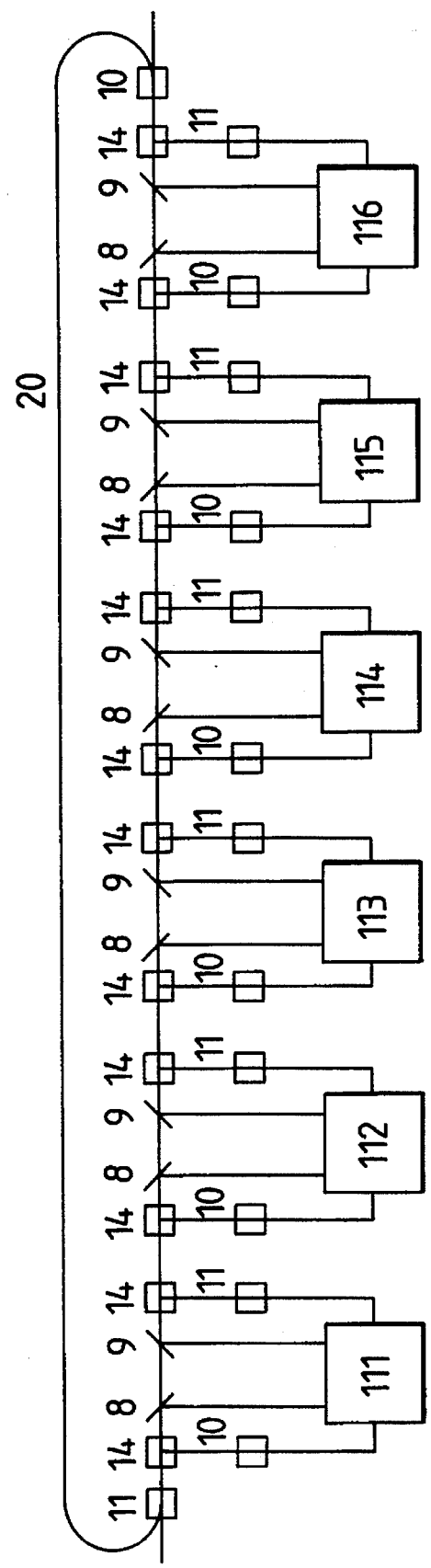
FIG. 16 is a block diagram showing the tenth embodiment of the communication system of the present invention.

FIG. 16 shows the network arrangement of the tenth embodiment of the communication system of the present invention. Referring to FIG. 16, this network arrangement includes nodes 111 to 116, each identical to that shown in FIG. 5. The same reference numerals in the tenth embodiment denote the same parts as in the above-described embodiment. In the tenth embodiment, video lines are formed into a loop type network, and control lines are formed into a bus type network. These networks are accommodated in one optical transmission path 20 through couplers 14 and couplers 8 and 9. A demultiplexer 10 and a multiplexer 11 are respectively arranged at the input and output portions of a control line of each node, and a demultiplexer 10 and a multiplexer 11 are respectively arranged at the two ends of the bus line, thus separating the two sets of lines from each other. The video lines perform the same operation as that of the loop type video line network in the second embodiment, and the control lines perform the same operation as that of the bus type control line network in the seventh embodiment.

In this embodiment, since the control signal is an optical signal, an optical receiver and an optical transmitter may be used as a receiver 6 and a transmitter 7 of each node, respectively.

[Eleventh Embodiment]

Figure 17:
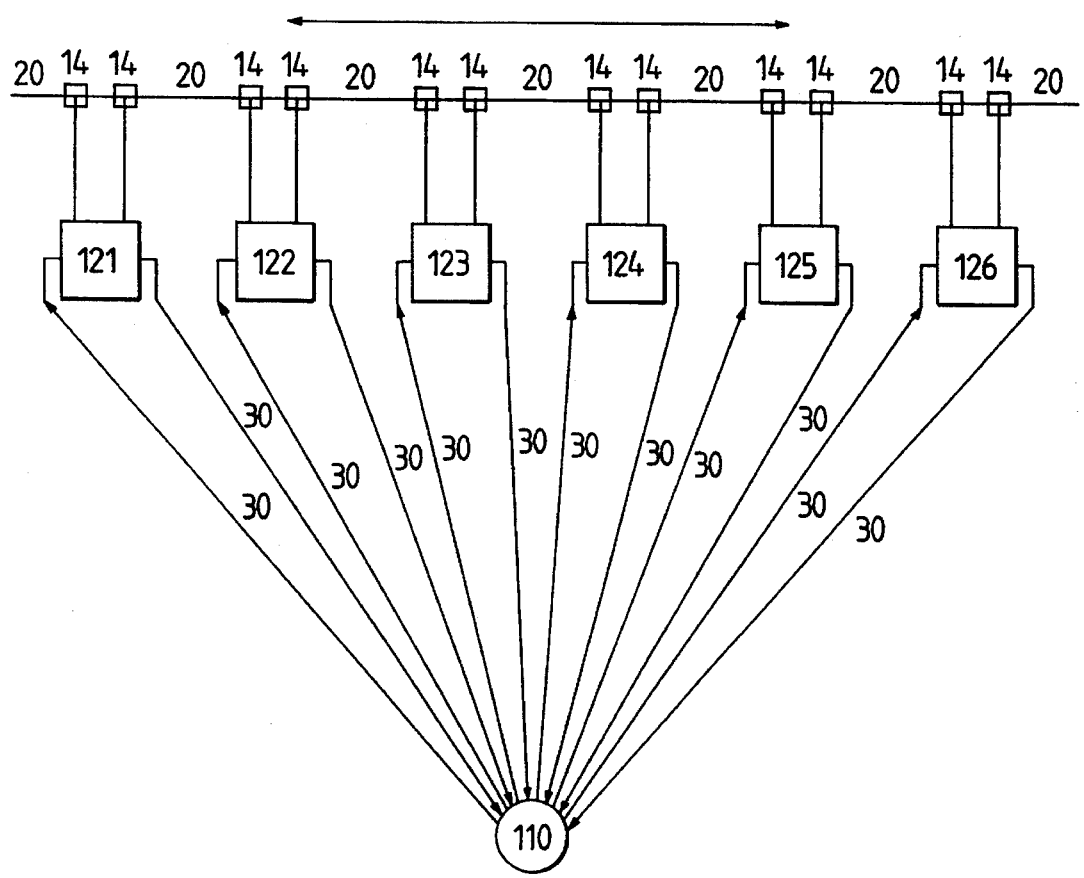
FIG. 17 is a block diagram showing the eleventh embodiment of the communication system of the present invention.

FIG. 17 shows the network arrangement of the eleventh embodiment of the communication system of the present invention. Referring to FIG. 17, this network arrangement includes an optical or electrical star coupler 110 and nodes 121 to 126, each identical to that shown in FIG. 5. The same reference numerals in the eleventh embodiment denote the same parts as in the above-described embodiment. In the eleventh embodiment, video lines are formed into a bus type network, and control lines are formed into a star type network. In this embodiment, the same operation as that in the first embodiment is performed. As a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical star coupler may be used as the star coupler 110. When the wavelength control signal is an electrical signal, an electrical transmission path may be used as the transmission path 30; an electric receiver and an electric transmitter may be used as the receiver 6 and the transmitter 7, respectively; and an electrical star coupler may be used as the star coupler 110.

A communication operation will be described next. Similar to the first embodiment, assume that a video signal is being communicated from the node 122 to the node 125 by using a wavelength $\lambda_1$, and a file with a large quantity of data is being transmitted from the node 124 to the node 126 by using a wavelength $\lambda_3$. In this case, when video communication is to be performed from the node 121 to the node 125, a communication operation is performed in the following manner. In order to perform video transmission right and line assignment, the node 121 acquires a token by the token passing bus scheme. The token circulates in the star type network in a predetermined order. Upon reception of the token, each node reproduces/relays the token and outputs it to the next node. Upon reception of the token through an optical receiver 6, the node 121 causes the communication control circuit 1 of the token passing bus scheme to check whether any free wavelengths are present in a wavelength table WC of the token, and selects a wavelength which is not used. In this case, since the wavelengths $\lambda_1$ and $\lambda_3$ are in use (the bits assigned to the wavelengths $\lambda_1$ and $\lambda_3$ are set to "1"), a wavelength $\lambda_2$ is selected. The node 121 then writes the address of the self-node 121, the address of the destination node 125, and the information indicating the selected wavelength $\lambda_2$ in a packet, and outputs the packet from the transmitter 7 to the transmission path 30. In addition, the node 121 updates the line management table WC of the token (sets the bit assigned to the wavelength $\lambda_2$ to "1"), and transmits it after the packet.

The communication control circuit 1 of the token passing bus scheme informs the set wavelength $\lambda_2$ to a communication control circuit 2 of the demand-assign wavelength-division multiplexing access scheme. The communication control circuit 2 then controls a tunable E/O converter 5 to set the wavelength $\lambda_2$.

The packet sent from the node 121 is input to the node 125 through the star coupler 110. The packet is then loaded in the communication control circuit 1. The communication control circuit 1 reads the destination address in the packet. Upon confirming that the packet is sent to the self-node, the communication control circuit 1 informs the reception wavelength written in the packet to the communication control circuit 2 of the wavelength-division multiplexing access scheme. Since the node 125 is receiving the video signal from the node 122, the node 125 maintains the current setting of a filter 3 until the communication is finished. Instead of this operation, the node 125 may inform the node 121 that reception is being performed.

When the communication from the node 122 is completed, the communication control circuit 2 of the node 125 controls the wavelength tunable filter 3 to set the passing wavelength to $\lambda_2$, and informs the completion of a preparation for reception to the communication control circuit 1 of the token passing bus scheme. Upon acquiring the token, the communication control circuit 1 of the token passing bus scheme writes the address of the self-node 125, the address of the destination node 121, and transmission request data in a packet, and sends it to the optical transmission path 30 through the transmitter 7. The packet passes through the star coupler 110 and is input to the communication control circuit 1 of the node 121. The communication control circuit 1 of the node 121 supplies the transmission request to a terminal to cause it to start transmission of a video signal.

The tunable E/O converter 5 of the node 121 converts the video signal into an optical signal having the wavelength $\lambda_2$, and outputs it from the node 121. The optical signal is then sent to an optical transmission path 20 through a coupler 14. The optical signal is transmitted in two directions through the optical transmission path 20. Each signal passes through the coupler 14 connected to the optical transmission path 20 to be transmitted to a corresponding end of the transmission path 20. Consequently, the signals with large quantities of data, having the wavelengths $\lambda_2$ and $\lambda_3$, are currently transmitted in the network. In each node, these optical signals are extracted through the coupler 14. Since the reception wavelength of a wavelength tunable filter 3 of the node 125 has already been set to $\lambda_2$, only the video signal having the wavelength $\lambda_2$ passes through the wavelength tunable filter 3 and is converted into an electrical signal by an O/E converter 4 to be received. Since the filters 3 of the remaining nodes are not set, no signal with a large quantity of data is received by these nodes.

The communication is finished in the same manner as in the first embodiment. When the communication of the video signal is finished, the node 121 extracts the token, and updates a line management table. When a video signal is not received for a predetermined period of time or more, or when information indicating the end of the communication is received, the node 125 cancels the setting of the wavelength tunable filter 3 and finishes the communication.

Communication between other nodes is performed in the same manner as described above.

[Twelfth Embodiment]

Figure 18:
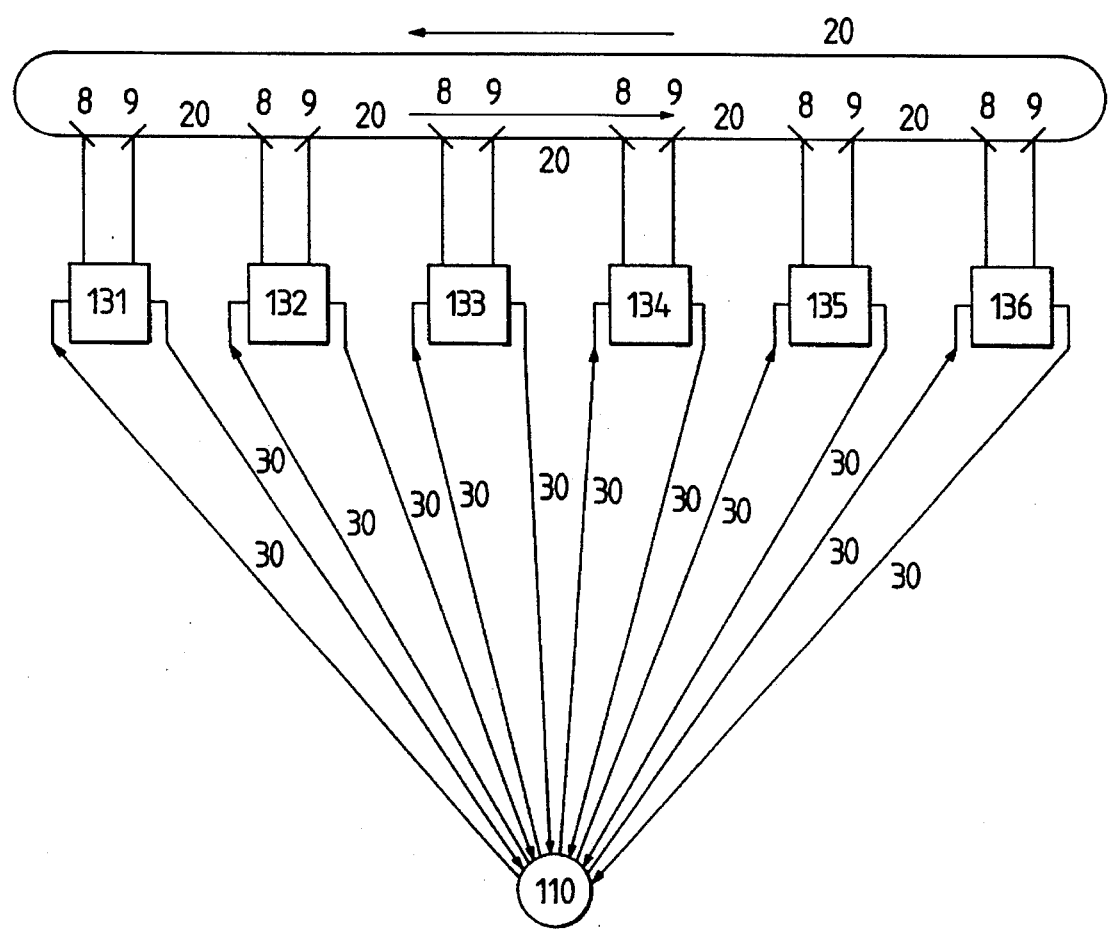
FIG. 18 is a block diagram showing the twelfth embodiment of the communication system of the present invention.

FIG. 18 shows the network arrangement of the twelfth embodiment of the communication system of the present invention. Referring to FIG. 18, this network arrangement includes nodes 131 to 136, each identical to that shown in FIG. 5. The same reference numerals in the twelfth embodiment denote the same parts as in the above-described embodiment. In the twelfth embodiment, video lines are formed into a loop type network to perform the same operation as that of the loop type video line network in the second embodiment, and control lines are formed into a star type network to perform the same operation as that of the star type control line network in the eleventh embodiment. Similar to the eleventh embodiment, as a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical star coupler may be used as a star coupler 110. When the wavelength control signal is an electrical signal, an electrical transmission path may be used as the transmission path 30; an electric receiver and an electric transmitter may be used as the receiver 6 and the transmitter 7, respectively; and an electrical star coupler may be used as the star coupler 110.

[Thirteenth Embodiment]

Figure 19:
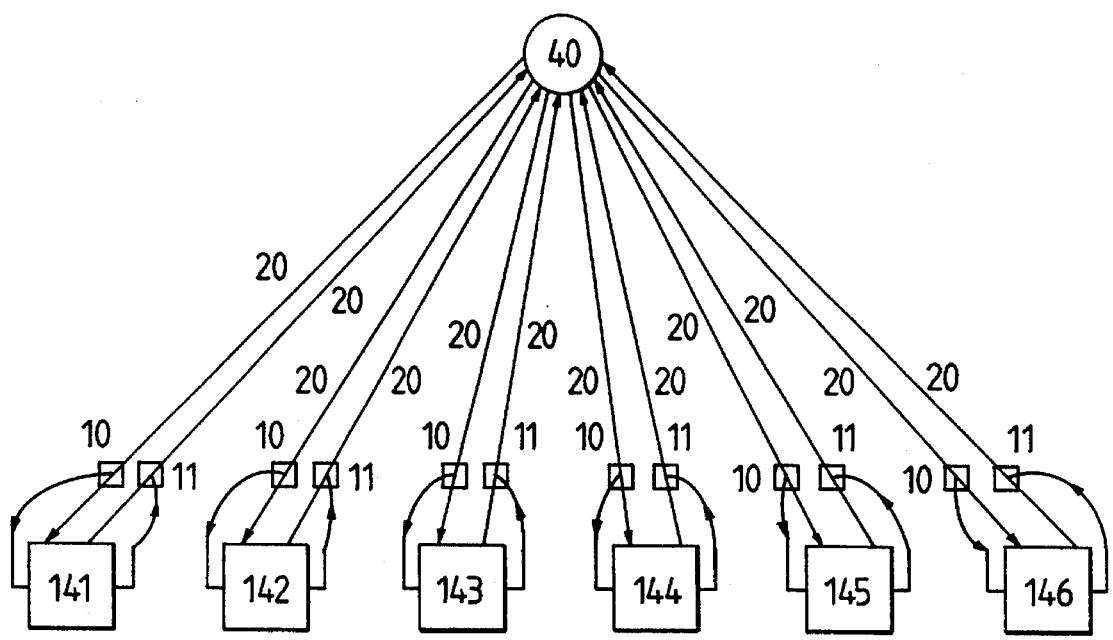
FIG. 19 is a block diagram showing the thirteenth embodiment of the communication system of the present invention.

FIG. 19 shows the network arrangement of the thirteenth embodiment of the communication system of the present invention. Referring to FIG. 19, this network arrangement includes nodes 141 to 146, each identical to the node shown in FIG. 5. The same reference numerals in the thirteenth embodiment denote the same parts as in the above-described embodiment. In the thirteenth embodiment, both a set of video lines and a set of control lines are formed into a star type network and are accommodated in one optical transmission path 20 through demultiplexers 10 and multiplexers 11. In this arrangement, the same operation as that in the fourth embodiment is performed. In this arrangement, the operation of the video line network is performed in the same manner as in the third embodiment, and the operation of the control line network is performed in the same manner as in the twelfth embodiment. In addition, since the wavelength control signal is an optical signal, an optical transmission path is used as a transmission path 20, and an optical receiver and an optical transmitter are respectively used as a receiver 6 and a transmitter 7.

[Fourteenth Embodiment]

Figure 20:
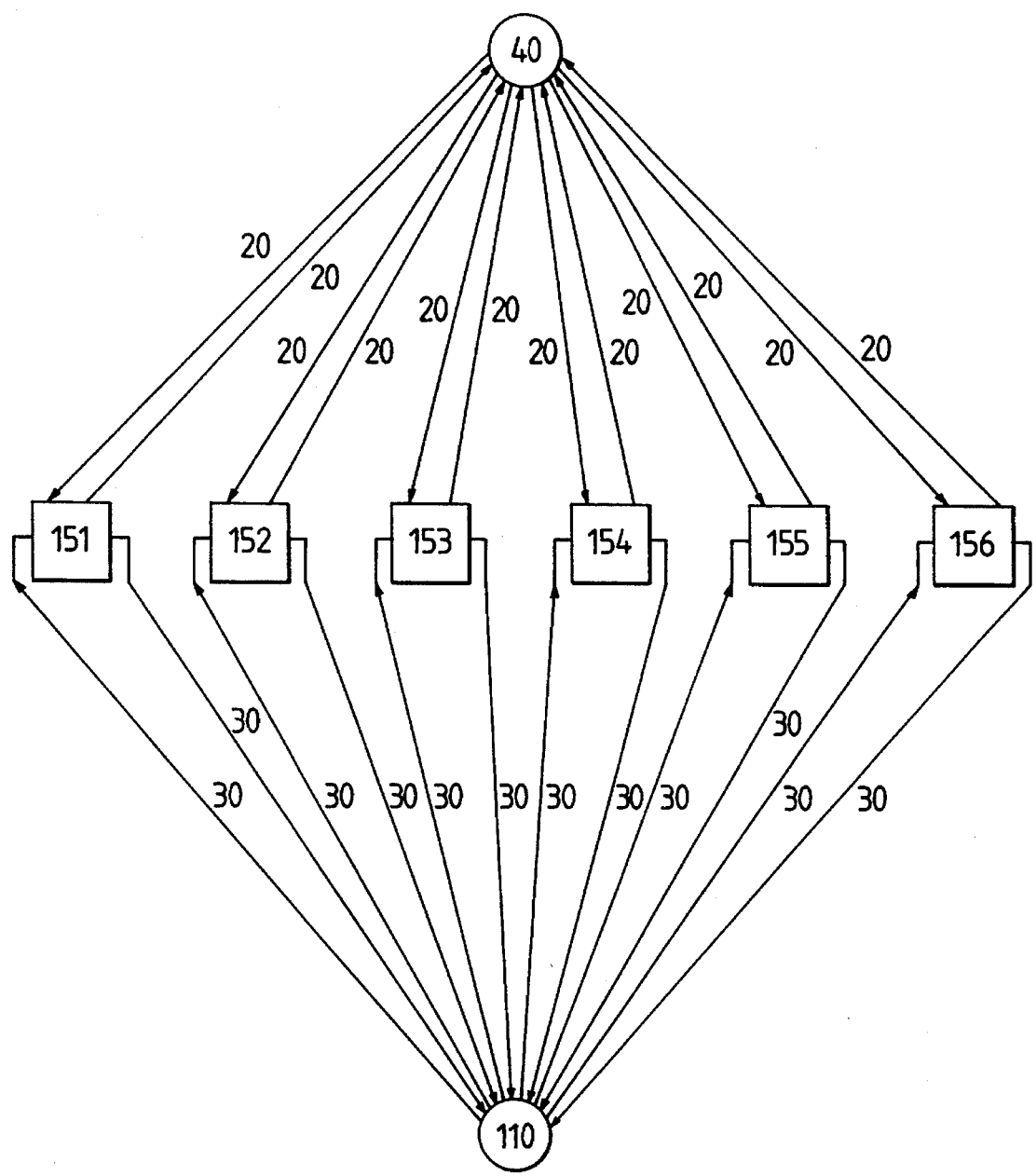
FIG. 20 is a block diagram showing the fourteenth embodiment of the communication system of the present invention.

FIG. 20 shows the network arrangement of the fourteenth embodiment of the communication system of the present invention. Referring to FIG. 20, this network arrangement includes nodes 151 to 156, each identical to that shown in FIG. 5. The same reference numerals in the fourteenth embodiment denote the same parts as in the above-described embodiment. In the fourteenth embodiment, a set of video lines and a set of control lines are respectively accommodated in different star type transmission paths. In this arrangement, the same operation as that in the thirteenth embodiment is performed. As a wavelength control signal, an optical signal or an electrical signal may be used. When the wavelength control signal is an optical signal, an optical transmission path may be used as a transmission path 30; an optical receiver and an optical transmitter may be used as a receiver 6 and a transmitter 7 of each node, respectively; and an optical star coupler may be used as a star coupler 110. When the wavelength control signal is an electrical signal, an electrical transmission path may be used as the transmission path 30; an electric receiver and an electric transmitter may be used as the receiver 6 and the transmitter 7, respectively; and an electrical star coupler may be used as the star coupler 110.

In each embodiment described above, only the used states of wavelengths are written in a line management table, and the addresses of a source node and a destination node are written in a packet. However, a line management table may include the addresses of a source node and a destination node.

In the above-described embodiments, the method of performing line assignment by arranging a line management table in a token in the token passing scheme has been described above. However, in the present invention, the communication scheme is not limited to the token passing scheme. For example, the present invention can be applied to a scheme of inserting information in a fixed-length time slot, e.g., a slotted ring or slotted bus scheme. In this case, a line management table is arranged in part of a fixed-length time slot, and a function of relaying a line management table is arranged between a node for generating a slot and a node for terminating the slot. With this arrangement, the same operation as that in the above-described embodiments can be performed.

[Fifteenth Embodiment]

Figure 21:
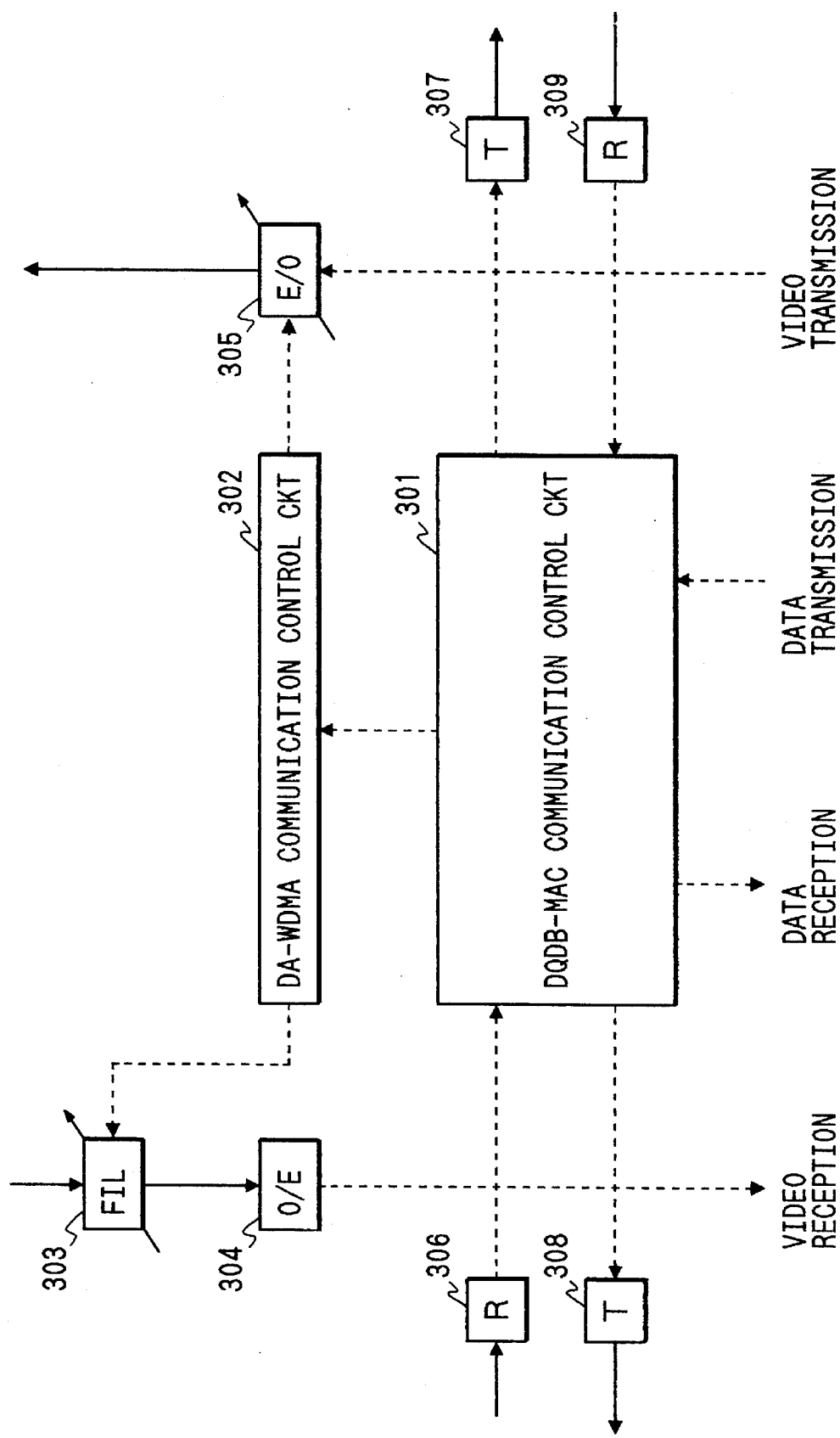
FIG. 21 is a block diagram showing the second embodiment of the node used in the communication system of the present invention.
Figure 22:
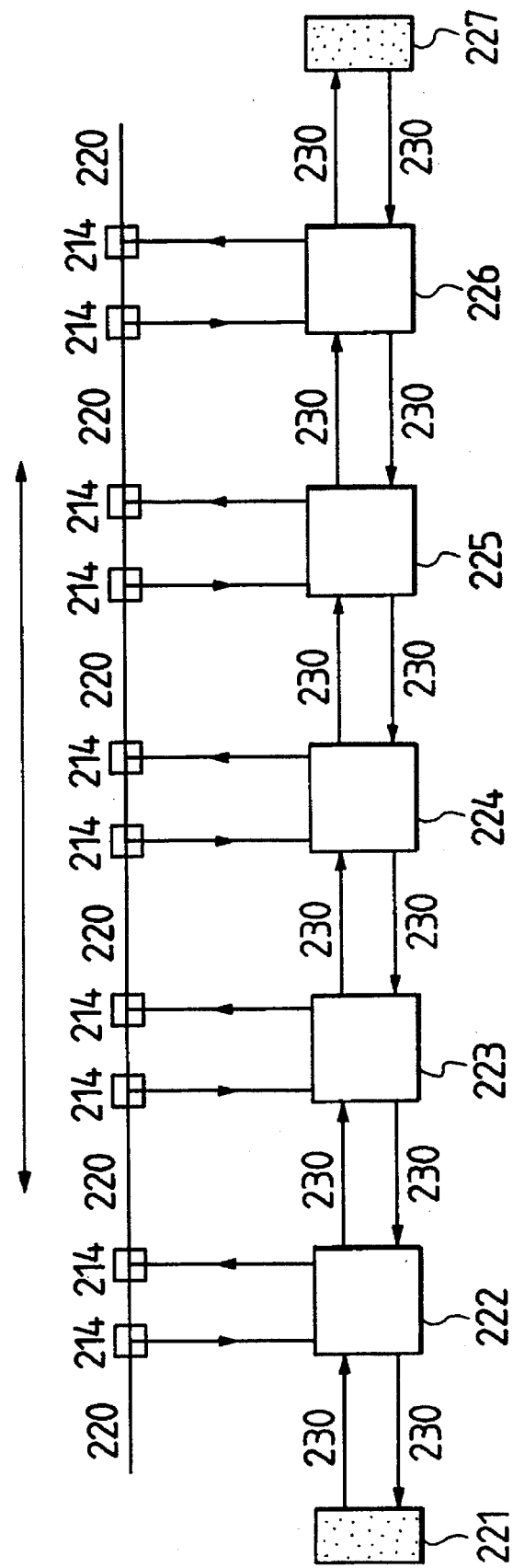
FIG. 22 is a block diagram showing the fifteenth embodiment of the communication system of the present invention.

FIG. 21 shows the second embodiment of the node used in the present invention. FIG. 22 shows the network arrangement of the fifteenth embodiment of the communication system of the present invention.

Referring to FIG. 21, each node includes a communication control circuit 301 of a DQDB (distributed queued dual bus) scheme, a communication control circuit 302 of the demand-assign wavelength-division multiplexing access (DA-WDMA) scheme, a wavelength tunable filter 303 for extracting an optical signal having an arbitrary wavelength from optical signals having a plurality of wavelengths, an O/E converter 304 for converting an optical signal into an electrical signal, a tunable E/O converter 305 for converting an electrical signal into an optical signal having an arbitrary wavelength, optical or electrical receivers 306 and 309, and optical or electrical transmitters 307 and 308.

The wavelength tunable filter 303 is an element or a device capable of changing the passing wavelength in accordance with the value of a current flowing in a wavelength control terminal. For example, a filter having a DFB laser structure can be used as the wavelength tunable filter 303. The tunable E/O converter 305 is an element or a device capable of changing the oscillation wavelength in accordance with the value of a current flowing in the wavelength control terminal. For example, a DFB laser or a DBR laser can be used as the tunable E/O converter 305. As the O/E converter 304, a PIN-PD or an APD is used. Referring to FIG. 21, each solid line indicates an optical transmission path or an optical signal; and each broken line, an electrical transmission path or an electrical signal.

Referring to FIG. 22, the network includes couplers for bidirectional transmission 214, an optical transmission path 220, slot generators 221 and 227 for generating frame pulses, nodes 222 to 226, each identical to that shown in FIG. 21, and optical or electrical transmission paths 230 constituting a composite arrangement of a DQDB line and a bus type wavelength-division multiplexing line.

In the wavelength-division multiplexing communication system of this embodiment, a signal with a large quantity of data, e.g., a video signal, which is difficult to transmit through the DQDB line, is transmitted through the wavelength-division multiplexing line, and other signals, e.g., a data signal and a control signal, are transmitted through the DQDB line. In the DQDB scheme, slots each containing information are transmitted from the slot generators 221 and 227, arranged on the two ends of each of two buses, in opposite directions. In each node, the number of nodes, on the upstream side, from which transmission requests are generated is known from the number of request bits on one bus. Upon letting free slots, equal in number to the request bits, pass by, each node acquires a transmission right and inserts transmission information in a free slot. This DQDB line can transmit a video signal and a sound signal as well as computer information. However, for example, a plurality of video signals cannot be simultaneously transmitted through the DQDB line by the existing techniques since they require a transmission capacity of several hundreds b/s to several Gb/s. For this reason, in the scheme of the embodiment, a video signal and the like are transmitted through the wavelength-division multiplexing line, and other signals are transmitted through the DQDB line. Both an optical signal and an electrical signal can be transmitted through the DQDB line.

Communication through the wavelength-division multiplexing line is performed after wavelengths to be used are assigned to a plurality of nodes, thus preventing the nodes from simultaneously using the same wavelength. A wavelength assignment method of this embodiment will be described. According to the present invention, a wavelength management table indicating used wavelengths is circulated through the DQDB line, and a node which extracts the wavelength management table selects a free wavelength, updates the wavelength management table, and sends the table to the transmission path 230. The wavelength management table is constituted by bits larger in number than the wavelengths used in the network. In the table, each bit is assigned to a wavelength to indicate whether the wavelength is in use. If a wavelength $\lambda_1$ is in use, the bit assigned to the wavelength $\lambda_1$ is set to "1". Otherwise, the bit is set to "0". If, for example, it is determined in advance that the wavelength management table is arranged in a slot following a frame pulse, each node can recognize the wavelength management table from the position of the frame pulse. In the DQDB scheme, since a double bus arrangement is employed, the wavelength management table transmitted through one bus is returned by one slot generator to be inserted in a slot following a frame pulse of the other bus, and the wavelength management table is transmitted upon setting a busy bit to "1" indicating that the slot is being used.

A communication operation will be described next. Assume that a video signal is being communicated from the node 223 to the node 225 by using a wavelength $\lambda_1$, and a file with a large quantity of data is being transmitted from the node 224 to the node 226 by using a wavelength $\lambda_3$. In this case, when video communication is to be preformed from the node 222 to the node 225, a communication operation is performed in the following manner. First, in the DQDB line, the node 222 performs assignment of wavelengths to be used in the wavelength-division multiplexing line. Upon reception of the wavelength management table, the node 222 selects a wavelength which is not used, updates the wavelength management table, and sends it to the transmission path 230. In this case, since the wavelengths $\lambda_1$ and $\lambda_3$ are in use (the bits assigned to the wavelengths $\lambda_1$ and $\lambda_3$ are set to "1"), a wavelength $\lambda_2$ is selected. The bit assigned to the wavelength $\lambda_2$ is then set to "1" and sent to the transmission path 230.

The node 222 then outputs a transmission request through the transmitter 308, and lets slots, input to the receiver 306, pass by until the value of a counter in the communication control circuit 301 of the DQDB scheme becomes "0". When the counter value becomes "0", the node 222 writes the self-address, the address of the destination node 225, and information indicating the selected wavelength $\lambda_2$ in a slot, and outputs the slot to the transmission path 230 through the transmitter 307. The communication control circuit 301 of the DQDB scheme informs the set wavelength $\lambda_2$ to the communication control circuit 302 of the demand-assign wavelength-division multiplexing access scheme. The communication control circuit 302 of the DA-WDMA scheme controls the tunable E/O converter 305 to set the transmission wavelength to wavelength $\lambda_2$. The slot sent from the node 222 is input to the node 225 through the nodes 223 and 224. The slot is then received by the receiver 306 and is loaded in the communication control circuit 301. The communication control circuit 301 of the DQDB scheme reads the destination address. Upon confirming that the slot is sent to the self-node, the communication control circuit 301 informs the written reception wavelength to the communication control circuit 302 of the DA-WDMA scheme. Since the node 225 is receiving the video signal from the node 223, the communication control circuit 302 of the DA-WDMA scheme maintains the setting of the filter 303 until the communication is finished. Instead of this operation, the node 225 may inform the node 222 that reception is being performed.

When the communication from the node 223 is finished, the communication control circuit 302 of the DA-WDMA scheme controls the wavelength tunable filter 303 to set the passing wavelength to $\lambda_2$, and informs the completion of a preparation for reception to the communication control circuit 301 of the DQDB scheme. The communication control circuit 301 of the DQDB scheme outputs a transmission request through the transmitter 307. When the value of the counter in the communication control circuit 301 of the DQDB scheme becomes "0", the communication control circuit 301 writes the address of the self-node 225, the address of the destination address 222, and the transmission request data for the video signal in the slot input to the receiver 309, and sends the slot to the transmission path 230 through the transmitter 308. The slot is input to the node 222 through the nodes 224 and 223. The slot is then received by the receiver 309 and is loaded in the communication control circuit 301. The DQDB scheme communication control circuit 301 of the node 222 sends the transmission request to a terminal to cause the terminal to start transmission of the video signal. The E/O converter 305 converts the video signal into an optical signal having the wavelength $\lambda_2$ and outputs the signal.

The optical signal is sent to the optical transmission path 220 through the coupler 214. The optical signal is transmitted in two directions through the optical transmission path 220. Part of the signal is branched by the coupler 214 in each node to be extracted, while the remaining portion of each signal passes through the coupler 214 to be transmitted to a corresponding end of the optical transmission path 220. Consequently, the signals with large quantities of data, having the wavelengths $\lambda_2$ and $\lambda_3$, are currently transmitted through the transmission path 220. Since the reception wavelength of the wavelength tunable filter 303 of the node 225 has already been set to $\lambda_2$, only the video signal having the wavelength $\lambda_2$ passes through the wavelength tunable filter 303 and is converted into an electrical signal by the O/E converter 304 to be received. Although the video signal is extracted by the remaining nodes, the signal is not received because the filters 303 are not set.

The procedure for finishing communication will be described next. When the communication of the video signal is finished, the node 222 extracts the wavelength management table, and updates it. In this case, the bit assigned to the wavelength $\lambda_2$ is set to "0", and the wavelength management table is sent to the transmission path 230. If the end of the communication needs to be informed to the node 225, the node 222 so informs it through the DQDB line. When a video signal is not received for a predetermined period of time or more, or when information indicating the end of the communication is received, the node 225 cancels the setting of the wavelength tunable filter 303 and finishes the communication.

Communication between other nodes is performed in the same manner as described above.

[Sixteenth Embodiment]

Figure 23:
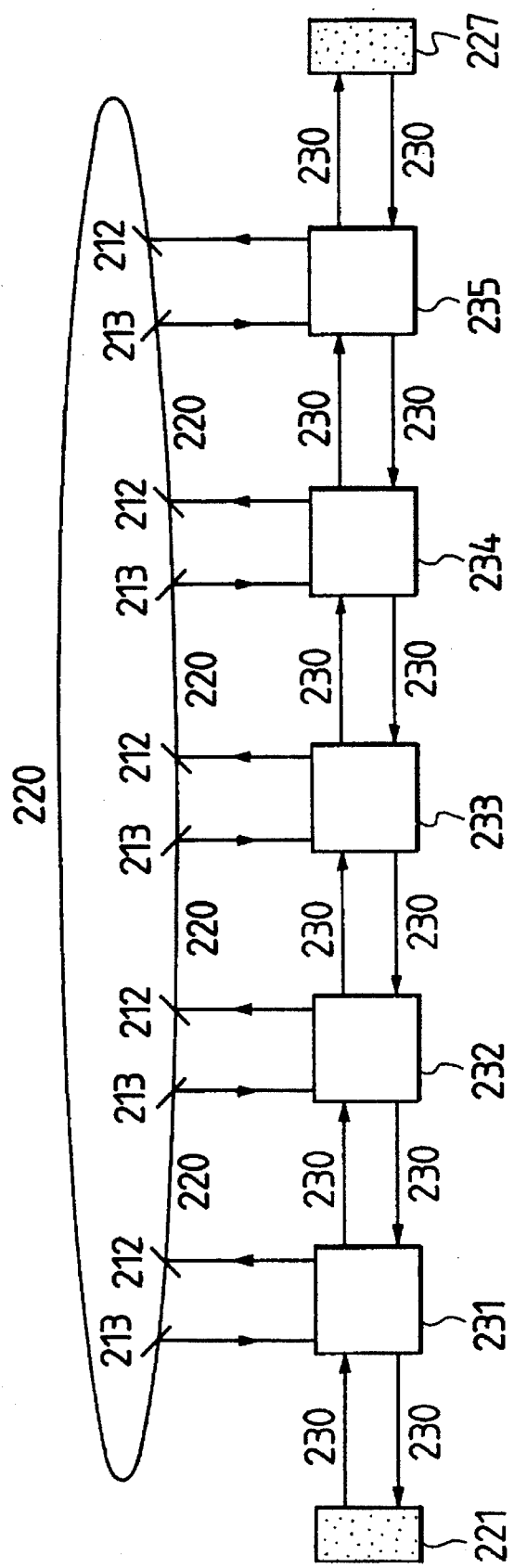
FIG. 23 is a block diagram showing the sixteenth embodiment of the communication system of the present invention.

FIG. 23 shows the network arrangement of the sixteenth embodiment of the communication system of the present invention. Referring to FIG. 23, this network arrangement includes couplers 213, each serving to branch an optical signal, couplers 212, each serving to merge optical signals, and nodes 231 to 235 each identical to that shown in FIG. 21. The same reference numerals in the sixteenth embodiment denote the same parts as in the fifteenth embodiment. In the sixteenth embodiment, a DQDB line and a loop type wavelength-division multiplexing line are formed into a composite arrangement, and the same operation as that in the fifteenth embodiment is performed.

A communication operation will be described next. Assume that a video signal is being communicated from the node 233 to the node 235 by using a wavelength $\lambda_1$, and a file with a large quantity of data is being transmitted from the node 234 to the node 231 by using a wavelength $\lambda_3$. In this case, when video communication is to be performed from the node 232 to the node 235, a communication operation is performed in the following manner. Similar to the fifteenth embodiment, in the DQDB line, assignment of wavelengths to be used in the wavelength-division multiplexing line is performed, and video communication from the node 232 to the node 235 is performed by using a wavelength $\lambda_2$. When a request to transmit a video signal is supplied from the node 235, an E/O converter 305 converts the video signal into an optical signal having the wavelength $\lambda_2$. The optical signal is output from the node 232 to an optical transmission path 220. This optical signal is sent to the optical transmission path 220 through the coupler 212 and is transmitted on the optical transmission path 220 through the couplers 213 and 212 connected thereto. In each node, part of the optical signal is branched to be extracted through the coupler 213, but the remaining portion is caused to pass therethrough. Although the portion, of the optical signal, which passes through each coupler 213, keeps circulating in the network, no problems are posed in communication, if the intensity of the optical signal which has circulated in the loop once is smaller than the light intensity at the start of transmission to be negligible.

Consequently, the signals with large quantities of data, having the wavelengths $\lambda_2$ and $\lambda_3$, are currently transmitted through the transmission path 220. Of these optical signals input to the node 235, only the video signal having the wavelength $\lambda_2$ passes through a wavelength tunable filter 303, since the reception wavelength of the wavelength tunable filter 303 has already been set to $\lambda_2$. The video signal is then converted into an electrical signal by an O/E converter 304 to be received. Although the video signal is extracted by the remaining nodes, the signal is not received because the filters 303 are not set.

The communication is finished in the same manner as in the fifteenth embodiment. When the communication of the video signal is finished, the node 232 extracts a wavelength management table, and updates the line management table. When a video signal is not received for a predetermined period of time or more, or when information indicating the end of the communication is received, the node 235 cancels the setting of the wavelength tunable filter 303 and finishes the communication.

Communication between other nodes is performed in the same manner as described above.

[Seventeenth Embodiment]

Figure 24:
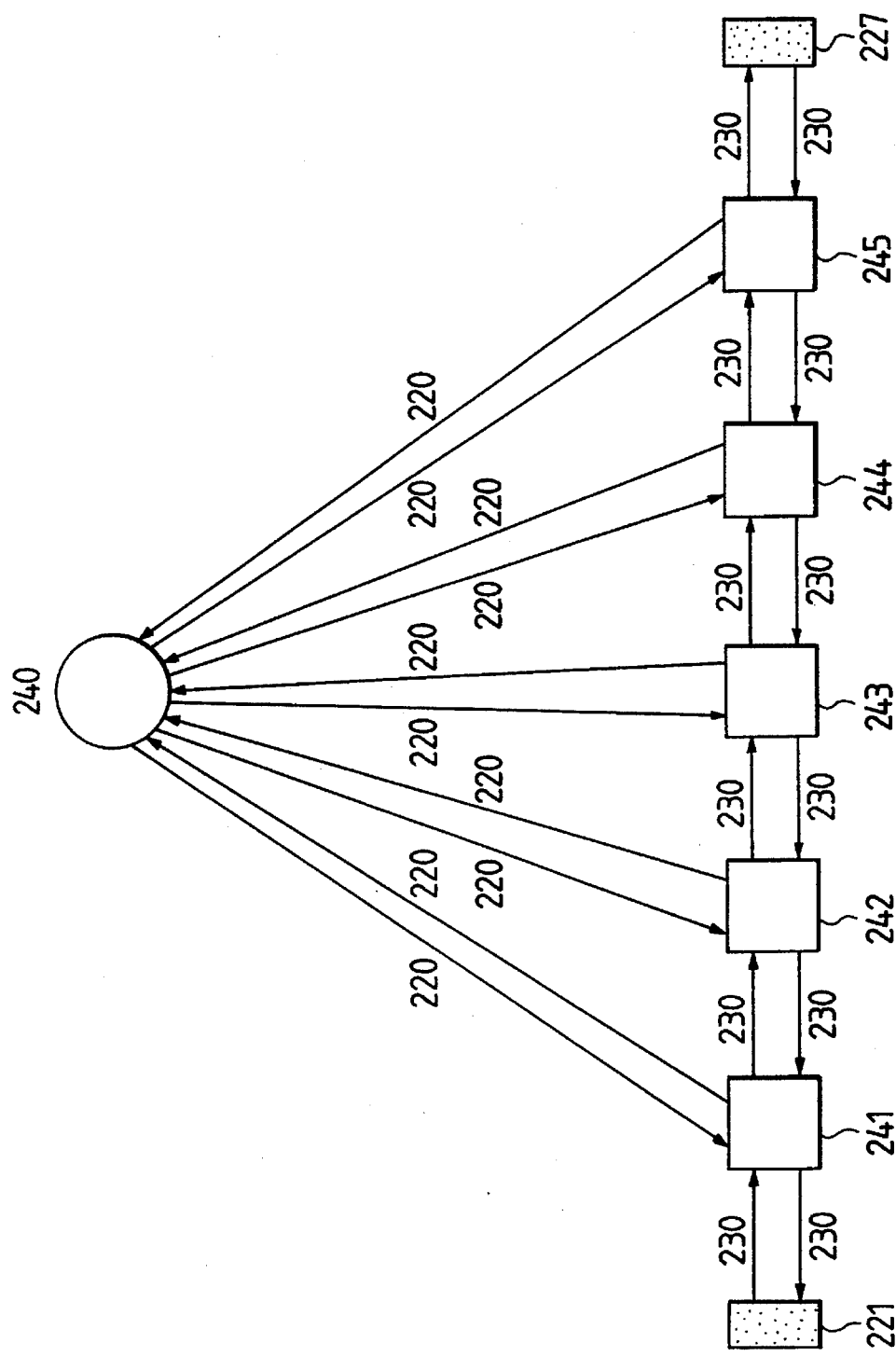
FIG. 24 is a block diagram showing the seventeenth embodiment of the communication system of the present invention.

FIG. 24 shows the network arrangement of the seventeenth embodiment of the communication system of the present invention. Referring to FIG. 24, this network arrangement includes a star coupler 240 and nodes 241 to 245, each identical to that shown in FIG. 21. The same reference numerals in the seventeenth embodiment denote the same parts as in the fifteenth embodiment. In the seventeenth embodiment, a DQDB line and a star type wavelength-division multiplexing line are formed into a composite arrangement, and the same operation as that in the fifteenth embodiment is performed.

A communication operation will be described next. Assume that a video signal is being communicated from the node 243 to the node 241 by using a wavelength $\lambda_1$, and a file with a large quantity of data is being transmitted from the node 244 to the node 241 by using a wavelength $\lambda_3$. In this case, when video communication is to be preformed from the node 242 to the node 245, a communication operation is performed in the following manner. Similar to the fifteenth embodiment, in the DQDB line, assignment of wavelengths to be used in the wavelength-division multiplexing line is performed, and video communication from the node 242 to the node 245 is performed by using the a wavelength $\lambda_2$. When a request to transmit a video signal is supplied from the node 245, an E/O converter 305 converts the video signal into an optical signal having the wavelength $\lambda_2$. The optical signal is output from the node 242 to an optical transmission path 220. This optical signal is equally branched by the coupler 240 to be distributed to all the nodes through the optical transmission path 220. Consequently, the signals with large quantities of data, having the wavelengths $\lambda_2$ and $\lambda_3$, are currently transmitted through the transmission path 220. Of these optical signals input to the node 245, only the video signal having the wavelength $\lambda_2$ passes through a wavelength tunable filter 303, since the reception wavelength of the wavelength tunable filter 303 has already been set to $\lambda_2$. The video signal is then converted into an electrical signal by an O/E converter 304 to be received. Although the video signal is extracted by the remaining nodes, the signal is not received because the filters 303 are not set.

The communication is finished in the same manner as in the fifteenth embodiment. When the communication of the video signal is finished, the node 242 extracts a wavelength management table, and updates the line management table. When a video signal is not received for a predetermined period of time or more, or when information indicating the end of the communication is received, the node 245 cancels the setting of the wavelength tunable filter 303 and finishes the communication.

Communication between other nodes is performed in the same manner as described above.

In the fifteenth to seventeenth embodiments, only the used states of wavelengths are written in a wavelength management table, and other pieces of information are written in a slot. However, a wavelength management table may include the addresses of a source node and a destination node, information indicating the start and end of communication and a standby state, and the like.

In the fifteenth to seventeenth embodiments, a DQDB line and a wavelength-division multiplexing line are separated from each other. However, optical signal wavelengths in a DQDB line may be set to be different from those used in a wavelength-division multiplexing line so that both the lines may be accommodated in one transmission path by using multiplexers and bnranching filters.

In the fifteenth to seventeenth embodiments, the wavelength-division multiplexing line is used to transmit a continuous signal such as a video signal. However, the use of the wavelength-division multiplexing line is not limited to this. For example, the line may be used to transmit a time-division multiplexing signal or a packet signal. In this case, the transmission section transmits a signal to the wavelength-division multiplexing line after performing assignment of a wavelength to be used and a time slot to be used in the DQDB line. The reception section then controls the wavelength tunable filter 3 through the communication control circuit 2 of the DA-WDMA scheme to receive a signal having an arbitrary wavelength and an arbitrary time slot.

In addition, a communication network may be constituted by a signal line of the DQDB scheme and a line including a time-division multiplexing signal or a packet signal, and a line assignment table having information indicating the used states of slots may be arranged in a signal line slot. In this case, a node which extracts the line assignment table selects a time slot which is not in use to perform assignment of a time slot to be used, and updates the line assignment table, which is circulated in the network. The transmission section transmits a signal to the time-division multiplexing line after performing assignment of a time slot to be used in the DQDB line. The reception section can receive a signal having an arbitrary time slot by controlling the filter through the communication control circuit of the TDMA scheme.

As has been described above, according to the present invention, a line management table for wavelength- and time-division multiplexing communication is circulated in a network, and each node which extracts the line management table performs line assignment to determine a communication line. With this operation, no line management node is required, and the procedure for communication can be simplified.

The present invention has various applications other than the embodiments described above. It is to be understood that the present invention includes all such applications as long as they fall within the spirit and scope of the invention.

What is claimed is:

1. A communication system comprising:
    a plurality of nodes;
    a data signal line, coupling said plurality of nodes to each other, for performing communication by using a signal multiplexed by a wavelength-division multiplexing scheme, a time-division multiplexing scheme, or both; and
    a control signal line coupling said plurality of nodes to each other so as to circulate a control signal including a management table indicating which, if any, time slot and which, if any, wavelength is currently being used for communication in said data signal line, wherein each node inputs the control signal circulating through said control signal line, selects at least one of a time slot and a wavelength not currently being used for communication, on the basis of the management table of the input control signal, performs communication through said data signal line by using the selected time slot, wavelength or both, and updates the management table and outputs the table to said control signal line.

2. A system according to claim 1, wherein said data signal line and said control signal line are accommodated in one loop type transmission path.

3. A system according to claim 1, wherein said data signal line is accommodated in a first loop type transmission path, and said control signal line is accommodated in a second loop type transmission path different from said first loop type transmission path.

4. A system according to claim 1, wherein said data signal line is accommodated in a star type transmission path, and said control signal line is accommodated in a loop type transmission path.

5. A system according to claim 1, wherein said data signal line is accommodated in a bus type transmission path, and said control signal line is accommodated in a loop type transmission path.

6. A system according to claim 1, wherein said data signal line and said control signal line are partly accommodated in one transmission path, and said transmission path is arranged such that a plurality of data signal lines are formed into a bus type network, and a control signal line is formed into a loop type network.

7. A system according to claim 1, wherein said data signal line and said control signal line are accommodated in one common bus type transmission path.

8. A system according to claim 1, wherein said data signal line is accommodated in a first bus type transmission path, and said control signal line is accommodated in a second bus type transmission path different from said first bus type transmission path.

9. A system according to claim 1, wherein said data signal line is accommodated in a star type transmission path, and said control signal line is accommodated in a bus type transmission path.

10. A system according to claim 1, wherein said data signal line is accommodated in a loop type transmission path, and said control signal line is accommodated in a bus type transmission path.

11. A system according to claim 1, wherein said data signal line and said control signal line are partly accommodated in one common transmission path, and said transmission path is arranged such that a plurality of data signal lines are formed into a loop type network, and a control signal line is formed into a bus type network.

12. A system according to claim 1, wherein said data signal line is accommodated in a bus type transmission path, and said control signal line is accommodated in a star type transmission path.

13. A system according to claim 1, wherein said data signal line is accommodated in a loop type transmission path, and said control signal line is accommodated in a star type transmission path.

14. A system according to claim 1, wherein said data signal line and said control signal line are accommodated in one common star type transmission path.

15. A system according to claim 1, wherein said data signal line is accommodated in a first star type transmission path, and said control signal line is accommodated in a second star type transmission path different from said first star type transmission path.

16. A system according to claim 1, wherein said control signal line is accommodated in a first bus type transmission path of a distributed queued dual bus scheme, and said data signal line is accommodated in a second bus type transmission path different from said first bus type transmission path.

17. A system according to claim 1, wherein said control signal line is accommodated in a bus type transmission path of a distributed queued dual bus scheme, and said data signal line is accommodated in a loop type transmission path.

18. A system according to claim 1, wherein said control signal line is accommodated in a bus type transmission path of a distributed queued dual bus scheme, and said data signal line is accommodated in a star type transmission path.

19. A communication method in a communication system constituted by a plurality of nodes, a data signal line, coupling said plurality of nodes to each other, for performing communication by using a signal multiplexed by a wavelength-division multiplexing scheme, a time-division multiplexing scheme, or both, and a control signal line which couples the plurality of nodes to each other, comprising the steps of:

circulating, in the control signal line, a control signal including a management table indicating which, if any, time slot and which, if any, wavelength is currently being used for communication in the data signal line;

inputting, at one node of the plurality of nodes, a packet of the management table circulating in the control signal line;

selecting, at that one node, a time slot, a wavelength, or both, not currently being used for communication, on the basis of the management table indicated by the input control signal;

performing, at that one node, communication through the data signal line by using the selected wavelength, time slot, or both; and updating the management table and outputting the table to the control signal line at that one node.

20. A method according to claim 19, further comprising the step of transmitting a control signal including an address of a node which is to transmit a data signal, and an address of a node which is to receive the data signal, through said control signal line.

21. A method according to claim 19, wherein the packet of the management table constitutes part of a token of a token passing scheme.

22. A method according to claim 19, wherein the packet of the management table constitutes one slot of a fixed-length slot scheme.

* * * * *

UNITED STATES PATENT AND TRADEMARK OFFICE
CERTIFICATE OF CORRECTION

PATENT NO. : 5,500,857
DATED : March 19, 1996
INVENTOR(S) : TORU NAKATA

It is certified that error appears in the above-identified patent and that said Letters Patent is hereby corrected as shown below:

On title page, item

[56] REFERENCES CITED

Other Publications,
under IEE PRoc. E. Computers...etc.,
"network."Proc." should read --network." ¶ Proc.--.
under "Design and...etc.,

AT [57] ABSTRACT

Line 8, "nodes" should read --nodes are--.

Signed and Sealed this

Thirteenth Day of August, 1996

*Attest:*

BRUCE LEHMAN

*Attesting Officer*   *Commissioner of Patents and Trademarks*